(12) United States Patent
Sudo et al.

(10) Patent No.: US 12,079,026 B2
(45) Date of Patent: Sep. 3, 2024

(54) CLOCK SIGNAL GENERATION CIRCUIT, DC/DC CONVERTER, PWM SIGNAL GENERATOR, AND VEHICLE

(71) Applicant: Rohm Co., Ltd., Kyoto (JP)

(72) Inventors: Takayuki Sudo, Kyoto (JP); Kazuhiro Murakami, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 70 days.

(21) Appl. No.: 18/090,729

(22) Filed: Dec. 29, 2022

(65) Prior Publication Data
US 2023/0213959 A1 Jul. 6, 2023

(30) Foreign Application Priority Data
Jan. 5, 2022 (JP) .................. 2022-000317

(51) Int. Cl.
*G06F 1/08* (2006.01)
*G06F 7/58* (2006.01)
(52) U.S. Cl.
CPC ............... *G06F 1/08* (2013.01); *G06F 7/582* (2013.01)
(58) Field of Classification Search
CPC .................................. G06F 7/582; G06F 1/08
USPC ......................................................... 713/501
See application file for complete search history.

(56) References Cited

U.S. PATENT DOCUMENTS

| 6,107,776 A * | 8/2000 | Nakazawa | H02P 27/08 |
| | | | 318/449 |
| 7,809,056 B2 * | 10/2010 | Chang | H03F 3/2175 |
| | | | 330/251 |
| 10,361,627 B1 * | 7/2019 | Goller | G06F 7/584 |
| 10,502,824 B2 * | 12/2019 | Roger | G01S 7/023 |
| 10,848,144 B2 * | 11/2020 | Nishigaki | H03K 17/163 |
| 2004/0090802 A1 * | 5/2004 | Pourseyed | H02M 1/44 |
| | | | 363/39 |

FOREIGN PATENT DOCUMENTS

JP 2004-153637 5/2004

OTHER PUBLICATIONS

"Reduction in Radiation Noise Level for Inductive Power Transfer Systems Using Spread Spectrum Techniques"—by Kent Inoue, Keisuke Kusaka, and Jun-Ichi Itoh; IEEE Transactions on Power Electronics vol. 33, No. 4, Apr. 2018; 10 pages (Year: 2018).*

* cited by examiner

*Primary Examiner* — Brian T Misiura
(74) *Attorney, Agent, or Firm* — Fish & Richardson P.C.

(57) ABSTRACT

A clock signal generation circuit includes: a triangular wave generation circuit configured to generate a triangular wave signal; a pseudo-random number generation circuit configured to generate a pseudo-random number signal; a limiter circuit configured to perform a limitation process of limiting an amount of change per unit time in the pseudo-random number signal and generate the pseudo-random number signal subjected to the limitation process as a limiter signal; a linear arithmetic circuit configured to generate a frequency control signal by performing a linear arithmetic operation on the triangular wave signal and the limiter signal; and an oscillator configured to generate a clock signal having a frequency corresponding to the frequency control signal.

9 Claims, 14 Drawing Sheets

US 12,079,026 B2

CLOCK SIGNAL GENERATION CIRCUIT, DC/DC CONVERTER, PWM SIGNAL GENERATOR, AND VEHICLE

CROSS-REFERENCE TO RELATED APPLICATION

This application is based upon and claims the benefit of priority from Japanese Patent Application No. 2022-000317, filed on Jan. 5, 2022, the entire contents of which are incorporated herein by reference.

TECHNICAL FIELD

The present disclosure relates to a clock signal generation circuit, a DC/DC converter, a PWM signal generator, and a vehicle.

BACKGROUND

A clock signal generation circuit that generates a clock signal is incorporated into various devices. For example, there is a DC/DC converter that performs DC/DC conversion using a frequency of a clock signal as a switching frequency. Many clock signals are rectangular signals with fixed frequencies. However, when the frequency of the clock signal is fixed, radiation noise at that frequency increases.

A spread spectrum technique is a technique that suppresses effects of radiation noise. The spread spectrum technique spreads the noise over a wide band, making it possible to suppress the effects of substantial noise.

However, there is room for improvement in the current spread spectrum technique related to clock signals.

SUMMARY

Some embodiments of the present disclosure provide a clock signal generation circuit that contributes to reducing radiation noise, a DC/DC converter, a PWM signal generator, and a vehicle.

According to one embodiment of the present disclosure, a clock signal generation circuit includes: a triangular wave generation circuit configured to generate a triangular wave signal: a pseudo-random number generation circuit configured to generate a pseudo-random number signal: a limiter circuit configured to perform a limitation process of limiting an amount of change per unit time in the pseudo-random number signal and generate the pseudo-random number signal subjected to the limitation process as a limiter signal: a linear arithmetic circuit configured to generate a frequency control signal by performing a linear arithmetic operation on the triangular wave signal and the limiter signal: and an oscillator configured to generate a clock signal having a frequency corresponding to the frequency control signal.

According to another embodiment of the present disclosure, a clock signal generation circuit includes: a triangular wave generation circuit configured to generate a triangular wave signal: a pseudo-random number generation circuit configured to generate a pseudo-random number signal: a linear arithmetic circuit configured to generate a linear arithmetic result signal by performing a linear arithmetic operation on the triangular wave signal and the pseudo-random number signal: a limiter circuit configured to perform a limitation process of limiting an amount of change per unit time in the linear arithmetic result signal and generate the linear arithmetic result signal subjected to the limitation process as a frequency control signal: and an oscillator configured to generate a clock signal having a frequency corresponding to the frequency control signal.

BRIEF DESCRIPTION OF DRAWINGS

The accompanying drawings, which are incorporated in and constitute a part of the specification, illustrate embodiments of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Reference Examples

Figure 18:
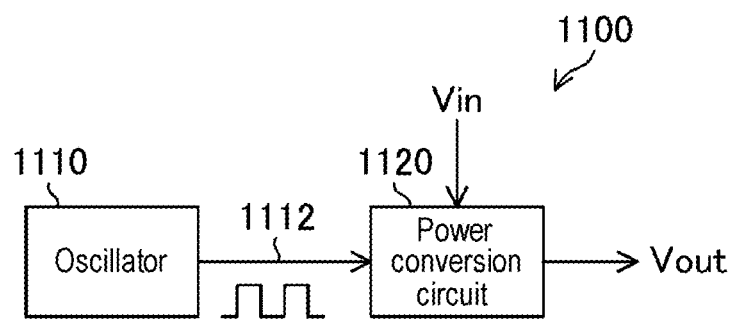
FIG. 18 is a configuration diagram of a DC/DC converter according to a first reference example.

FIG. 18 shows a configuration of a DC/DC converter 1100 according to a first reference example. The DC/DC converter 1110 includes an oscillator 1110 and a power conversion circuit 1120. In reference examples including the first reference example, an oscillator may be considered as being included in a DC/DC converter as a component thereof. However, the oscillator may also be considered as being connected to the DC/DC converter, and in this case, a power conversion circuit itself may be considered as corresponding to the DC/DC converter.

In the converter 1100, a rectangular wave signal 1112 having a fixed frequency and output from the oscillator 1110 is supplied as a clock signal to the power conversion circuit 1120. The power conversion circuit 1120 uses the frequency of the clock signal as a switching frequency to switch an input voltage Vin, thereby generating an output voltage Vout. The input voltage Vin and the output voltage Vout are DC voltages different from each other. In the configuration of FIG. 18, large noise occurs in the frequency of the clock signal, and the noise causes deterioration of EMI (Electro Magnetic Interference) characteristics.

Figure 19:
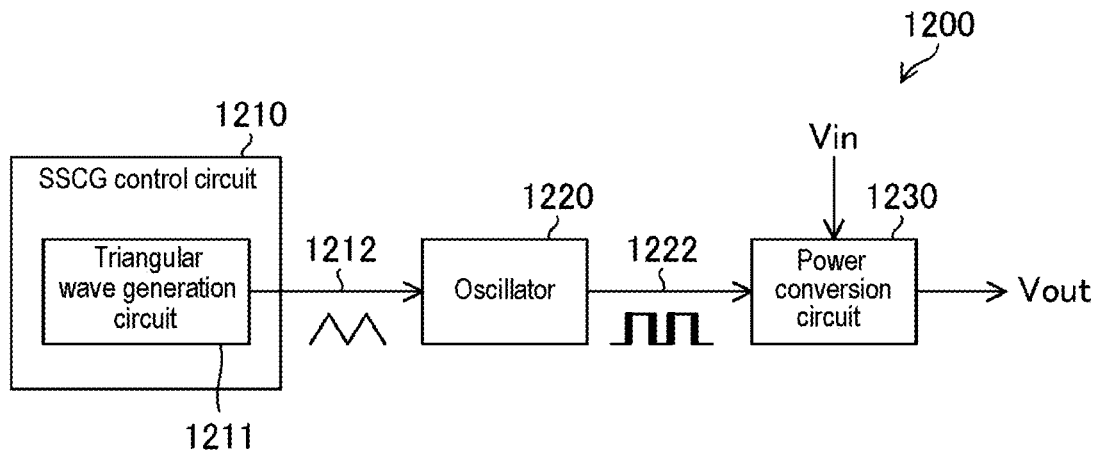
FIG. 19 is a configuration diagram of a DC/DC converter according to a second reference example.

FIG. 19 shows a configuration of a DC/DC converter 1200 according to a second reference example. The converter 1200 includes an SSCG control circuit 1210, an oscillator 1220, and a power conversion circuit 1230. The power conversion circuit 1230 is a circuit similar to the power conversion circuit 1120 of FIG. 18. A triangular wave signal 1212 is output from a triangular wave generation circuit 1211 provided in the control circuit 1210. The triangular wave signal 1212 is a digital triangular wave signal. The oscillator 1220 supplies a clock signal 1222 having a frequency corresponding to the triangular wave signal 1212 to the power conversion circuit 1230. The oscillator 1220 is provided with a DAC (Digital-Analog Converter) that receives the triangular wave signal 1212, and the frequency of the clock signal 1222 is determined based on the output of the DAC. By modulating the frequency of the clock signal 1222 based on the triangular wave signal 1212, radiation noise at a switching frequency is reduced in the second reference example as compared with the first reference example. However, in the second reference example, new noise is generated at a frequency of the triangular wave and frequencies of harmonics of the triangular wave, which becomes a new cause of deterioration of EMI characteristics.

Figure 20:
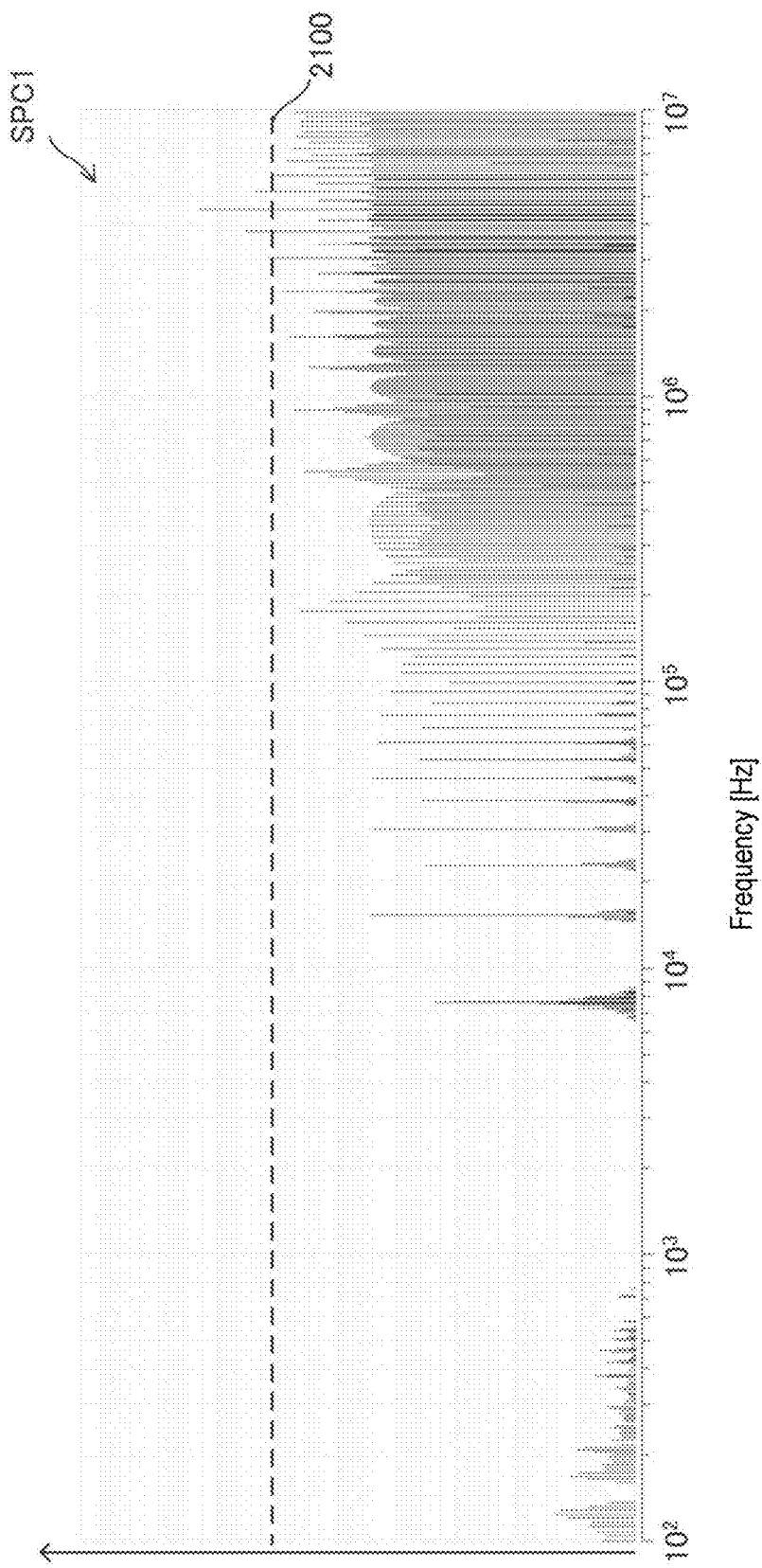
FIG. 20 is a diagram showing a power spectrum of radiation noise according to the first reference example.
Figure 21:
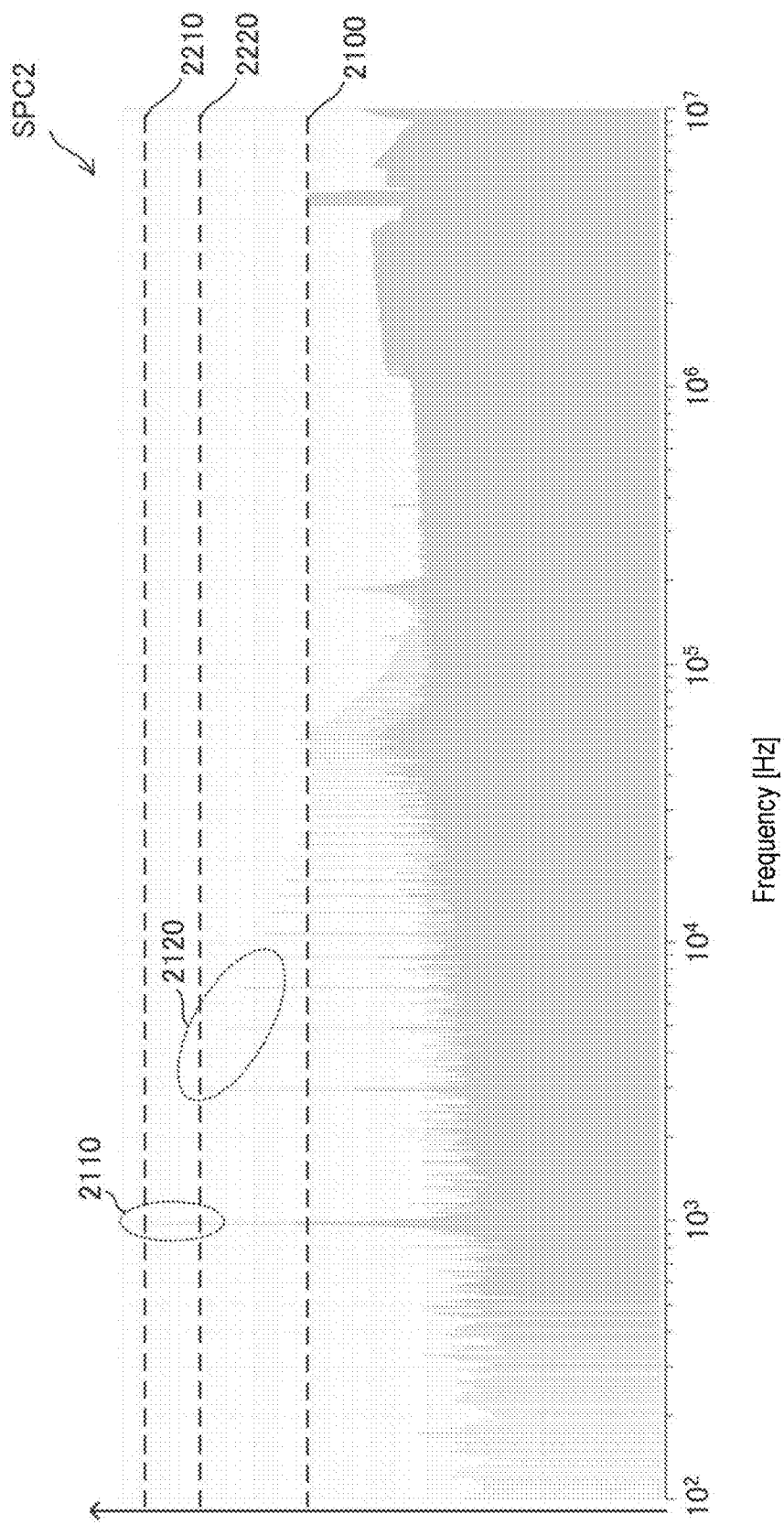
FIG. 21 is a diagram showing a power spectrum of radiation noise according to the second reference example.

FIG. 20 shows a power spectrum SPC1 of radiation noise generated in the DC/DC converter 1100, and FIG. 21 shows a power spectrum SPC2 of radiation noise generated in the DC/DC converter 1200. Here, it is assumed that the switching frequency is fixed at about 4.5 MHz (megahertz) in the first reference example and a center frequency of the clock signal is set to about 4.5 MHz in the second reference example. It is also assumed that the frequency of the triangular wave is set to about 1 kHz (kilohertz).

A broken line 2100 indicating a specific power is shown in FIGS. 20 and 21 for the sake of convenience. A broken line 2210 shown in FIG. 21 corresponds to a power of a frequency component of the triangular wave in the spectrum SPC2. A broken line 2220 corresponds to a power of a primary harmonic component of the triangular wave in the spectrum SPC2. The broken lines 2210 and 2220 are also referred to later. It can be recognized that noise around the center frequency of the clock signal is reduced in the second reference example as compared with the first reference example. On the other hand, in the second reference example, it can be recognized that new noise (corresponding to dotted line elliptical portions 2110 and 2120 in FIG. 21) is generated at the frequency of the triangular wave and the frequency of the harmonic of the triangular wave.

Figure 22:
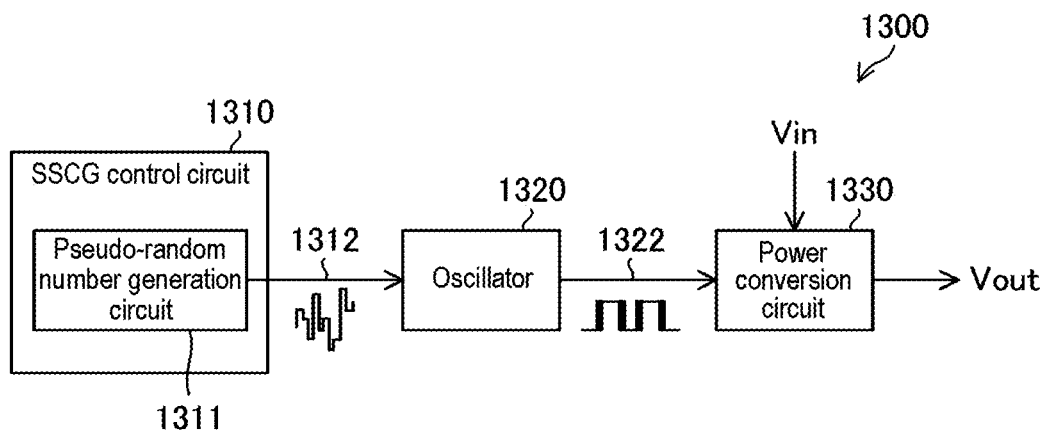
FIG. 22 is a configuration diagram of a DC/DC converter according to a third reference example.

FIG. 22 shows a configuration of a DC/DC converter 1300 according to a third reference example. The converter 1300 includes an SSCG control circuit 1310, an oscillator 1320, and a power conversion circuit 1330. The power conversion circuit 1330 is a circuit similar to the power conversion circuit 1120 of FIG. 18. A pseudo-random number signal 1312 representing a digital pseudo-random number is output from a pseudo-random number generation circuit 1311 provided in the control circuit 1310. The oscillator 1320 supplies a clock signal 1322 having a frequency according to the pseudo-random number signal 1312 to the power conversion circuit 1330. The oscillator 1320 is provided with a DAC that receives the pseudo-random number signal 1312, and the frequency of the clock signal 1322 is determined based on the output of the DAC. Thus, the frequency of the clock signal 1322 is modulated based on the pseudo-random number signal 1312. Therefore, noise at the frequency of the triangular wave and frequencies of harmonics of the triangular wave can be reduced in the third reference example as compared with the second reference example.

However, in the third reference example, an input value to the DAC changes randomly within a numerical range of the pseudo-random numbers. Therefore, the input value to the DAC may fluctuate momentarily and significantly, resulting in momentary and significant fluctuations of the frequency of the clock signal 1322. Such rapid fluctuations in the frequency of the clock signal become a factor in increasing noise.

By limiting an amount of change per fluctuation in the input value to the DAC, it is possible to suppress the noise factor. However, when the above limitation is applied, there is a concern that the frequency of the generated clock signal may be unevenly distributed in a portion of a modulation region. An example obtained by applying the above limitation to the third reference example (see FIG. 22) is referred to as a fourth reference example, and the uneven distribution will be described by focusing on the fourth reference example.

Figure 23:
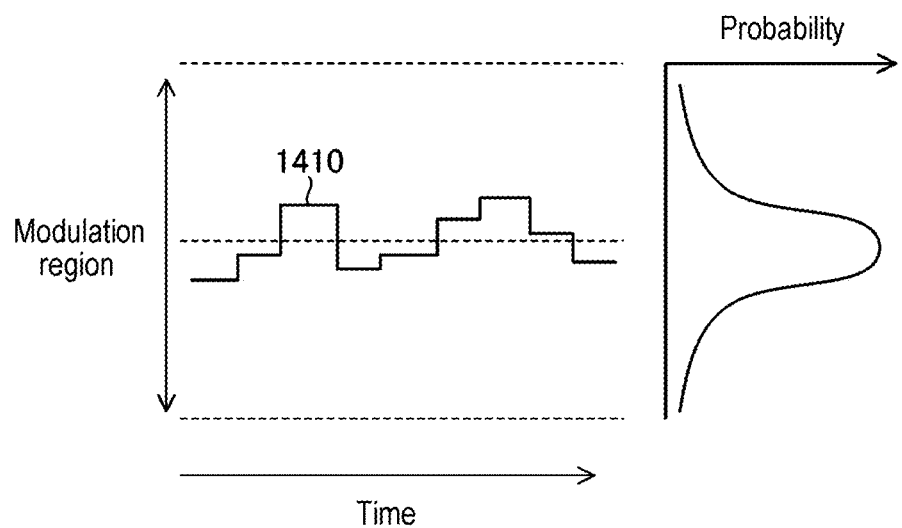
FIG. 23 is a diagram for explaining a reason why a frequency of a generated clock signal is unevenly distributed in a portion of a modulation region according to a fourth reference example.

A polygonal line 1410 in FIG. 23 represents a temporal change of the input value to the DAC in the fourth reference example. Since the clock signal has a frequency corresponding to the input value to the DAC, it can be said that the polygonal line 1410 represents a temporal change in the frequency of the clock signal in the fourth reference example.

A numerical range of the pseudo-random numbers corresponds to a modulation region of the clock signal frequency. Originally, the input value to the DAC randomly changes within the numerical range of the pseudo-random numbers. However, when the amount of change per fluctuation in the input value to the DAC is limited, the input value to the DAC is likely to be unevenly distributed in a portion of the numerical range. This corresponds to the fact that the frequency of the clock signal is likely to be unevenly distributed in a portion of the modulation region.

As a specific example, consider a case where a pseudo-random number has a value within a numerical range of 1 to 255, and the frequency of the clock signal increases from a first frequency to a second frequency as the value of the pseudo-random number increases from 1 to 255. In this case, when the amount of change per fluctuation in the input value to the DAC is limited to 10 or less, if an initial input value to the DAC is 128, the next input value to the DAC is within a range of "128±10." Also in subsequent stages, the input value to the DAC fluctuates within ±10. Although the input value to the DAC may be near 1 or near 255 according to the generated pseudo-random number, the input value to the DAC is likely to be unevenly distributed near the initial value (i.e., 128) probabilistically. When such uneven distribution occurs, a degree of spread of the clock signal frequency becomes low, and as a result, it is difficult to improve EMI performance.

<<Suggested Technique in Comparison with Reference Examples>>

Taking those described above into consideration, the inventors developed a method in which modulation by a triangular wave and modulation by a pseudo-random number are combined and then a limitation on an amount of modulation is added.

Examples of embodiments of the present disclosure related to the method will be described below in detail with reference to the drawings. Throughout the referenced drawings, the same parts are denoted by the same reference numerals, and duplicate explanation thereof will be omitted in principle. In the present disclosure, for the sake of simplifying description, by describing a symbol or a code that refers to information, a signal, a physical quantity, an element, a part, and the like, the information, the signal, the physical quantity, the element, the part, and the like, corresponding to the symbol or the code may be omitted or abbreviated. For example, a triangular wave signal (see FIG. 1) referred to by "S111" to be described later may be written as a triangular wave signal S111, or may be abbreviated as a signal S111. However, they all refer to the same thing.

Some terms used in the description of the embodiments of the present disclosure will be described. The ground refers to a reference conductive portion having a reference potential of 0 V (zero volts) or refers to the potential of 0 V itself. The reference conductive portion is formed of a conductor such as metal. The potential of 0 V may be referred to as a ground potential. In the embodiments of the present disclosure, a voltage shown without any particular reference represents a potential seen from the ground. A level refers to a level of potential, with a high level having a higher potential than a low level for any signal or voltage of interest. For any signal or voltage of interest, switching from a low level to a high level is called an up-edge (or rising edge) and switching from a high level to a low level is called a down-edge (or falling edge).

For any transistor configured as an FET (Field Effect Transistor) including a MOSFET, an on state refers to a state in which a drain and source of the transistor are electrically connected, and an off state refers to a state in which the drain and source of the transistor are electrically disconnected (cut-off state). The same applies to transistors that are not classified as FETs. Unless otherwise specified, a MOSFET is regarded as an enhancement type MOSFET. MOSFET is an abbreviation for "metal-oxide-semiconductor field-effect transistor." Further, it may be considered that a back gate is short-circuited to a source in any MOSFET unless otherwise specified.

Hereinafter, the on state and the off state of any transistor may be simply expressed as on and off, respectively. A connection between a plurality of parts forming a circuit, such as an arbitrary circuit element, a wiring (line), and a node, may be understood to refer to an electrical connection unless otherwise specified.

First Embodiment

Figure 1:
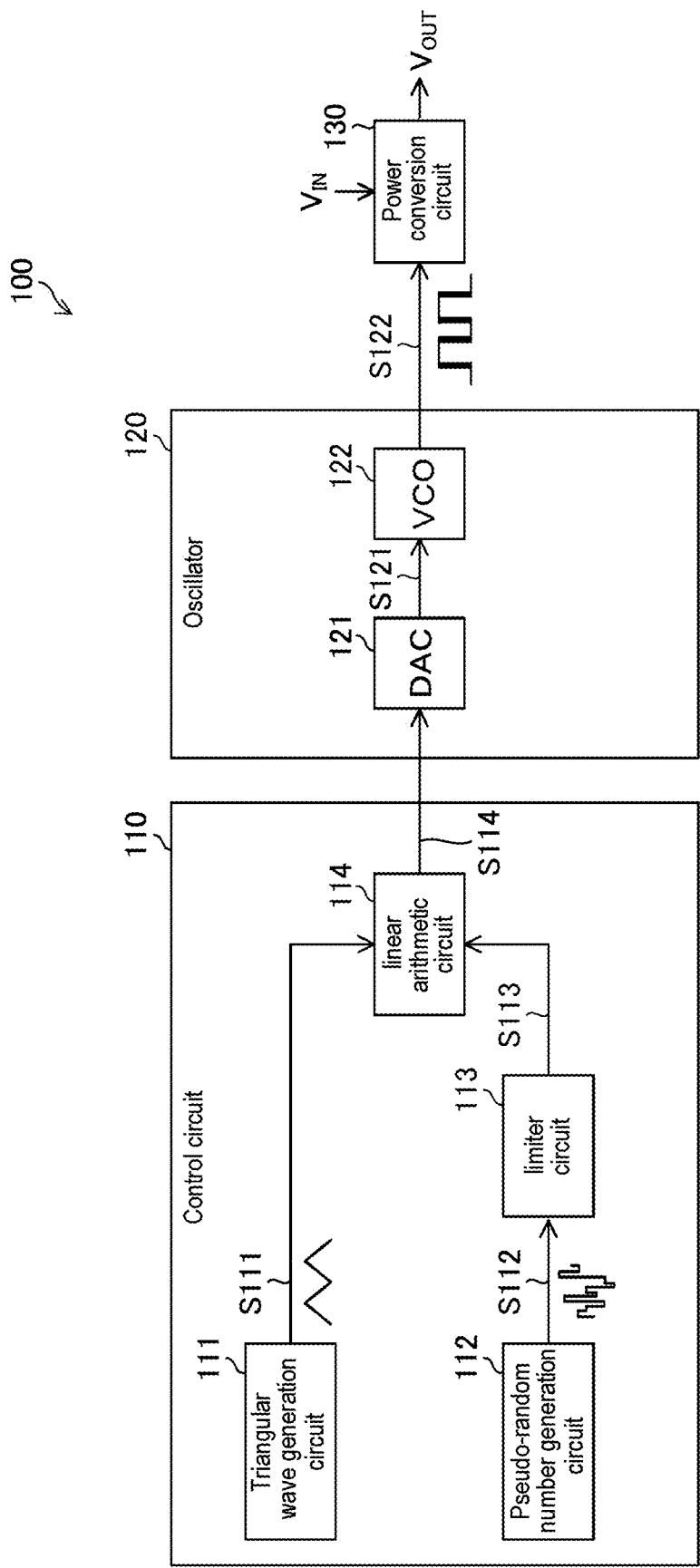
FIG. 1 is a configuration diagram of a DC/DC converter according to a first embodiment of the present disclosure.

A first embodiment of the present disclosure will be described. FIG. 1 is a configuration block diagram of a DC/DC converter (DC/DC converting device) 100 according to the first embodiment. The DC/DC converter 100 includes a control circuit 110 for SSCG (Spread Spectrum Clock Generator), an oscillator 120, and a power conversion circuit 130. The control circuit 110 and the oscillator 120 form a clock signal generation circuit that generates a frequency-spread clock signal. Here, it is considered that the DC/DC converter is formed by the clock signal generation circuit and the power conversion circuit 130, but it may be considered that the power conversion circuit 130 itself is the DC/DC converter and the clock signal generation circuit (110 and 120) is connected to the DC/DC converter.

The control circuit 110 includes a triangular wave generation circuit 111, a pseudo-random number generation circuit 112, a limiter circuit 113, and a linear arithmetic circuit 114.

Figure 2:
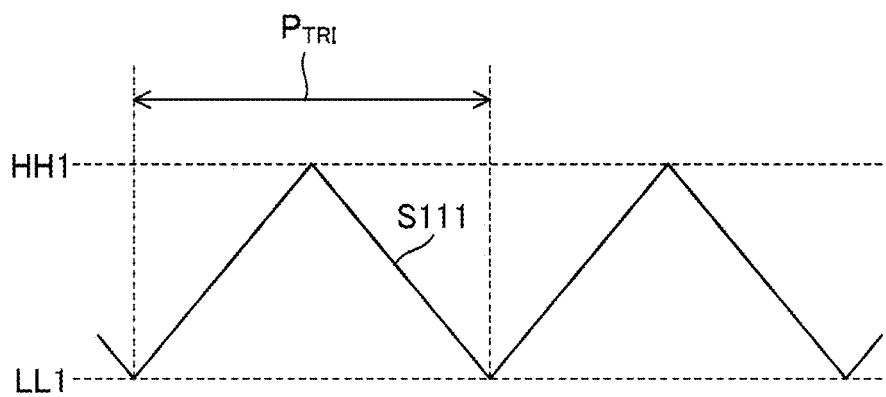
FIG. 2 is a waveform diagram of a triangular wave signal according to the first embodiment of the present disclosure.

The triangular wave generation circuit 111 generates and outputs the triangular wave signal S111. The triangular wave signal S111 is a digital signal representing a triangular wave, and therefore, a value of the triangular wave signal S111 is a digital value. FIG. 2 shows a waveform of the triangular wave signal S111. Minimum and maximum values of the triangular wave signal S111 are represented by LL1 and HH1, respectively. The maximum value HH1 is larger than the minimum value LL1. The triangular wave generation circuit 111 repeatedly executes the following unit operation of generating a triangular wave at a predetermined period $P_{TRI}$.

In the triangular wave generation unit operation, the triangular wave generation circuit 111 sets a state where the value of the triangular wave signal S111 is equal to the predetermined minimum value LL1 as a starting point, and linearly and monotonically increases the value of the triangular wave signal S111 at a predetermined increasing rate from the minimum value LL1 to the predetermined maximum value HH1. In the triangular wave generation unit operation, when the value of the triangular wave signal S111 reaches the maximum value HH1, the triangular wave generation circuit 111 linearly and monotonically decreases the value of the triangular wave signal S111 at a predetermined decreasing rate from the maximum value HH1 to the minimum value LL1. Thereafter, the above-described triangular wave generation unit operation is repeated. Since one triangular wave generation unit operation is performed over a time period of the period $P_{TRI}$, a frequency of the triangular wave signal S111 is expressed by $(1/P_{TRI})$.

Figure 3:
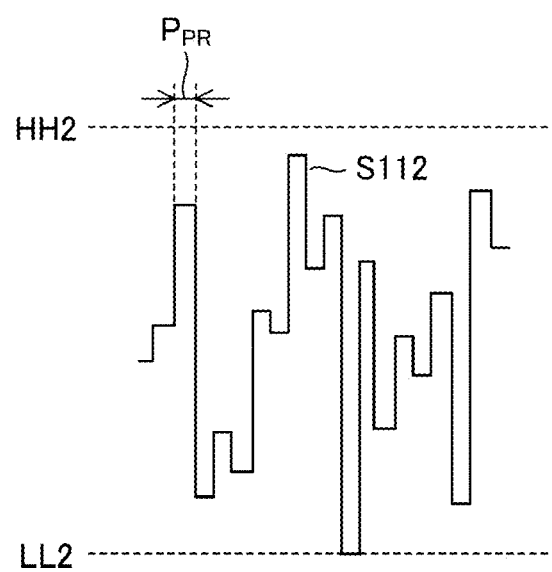
FIG. 3 is a waveform diagram of a pseudo-random number signal according to the first embodiment of the present disclosure.

The pseudo-random number generation circuit 112 generates and outputs a pseudo-random number signal S112. The pseudo-random number signal S112 is a digital signal representing a pseudo-random number, and therefore, a value of the pseudo-random number signal S112 is a digital value. The pseudo-random number generation circuit 112 can be configured by a linear feedback shift register. FIG. 3 shows a waveform example of the pseudo-random number signal S112. The pseudo-random number generation circuit 112 updates the value of the pseudo-random number signal S112 at a predetermined period $P_{PR}$. The period $P_{PR}$ is sufficiently shorter than the above-mentioned period $P_{TRI}$. The update period of the value of the triangular wave signal S111 may be the same as the period $P_{PR}$, or may be m times or $(1/m)$ times the period $P_{PR}$. Here, m is an integer of two or more.

A time period corresponding to a length of the period $P_{PR}$ may be hereinafter referred to as a unit time $P_{PR}$. Then, it can be said that the pseudo-random number generation circuit 112 updates and outputs the value of the pseudo-random number signal S112 based on the unit time $P_{PR}$ as a period (that is, each time the unit time $P_{PR}$ elapses). Minimum and maximum values of the pseudo-random number signal S112 are represented by LL2 and HH2, respectively. The maximum value HH2 is larger than the minimum value LL2. The pseudo-random number generation circuit 112 generates a pseudo-random number having a value within a range from the minimum value LL2 to the maximum value HH2, and generates and outputs the pseudo-random number signal S112 having a value of the generated pseudo-random number.

The pseudo-random number signal S112 output from the pseudo-random number generation circuit 112 is input to the limiter circuit 113. The limiter circuit 113 performs a limitation process on the input pseudo-random number signal S112, and generates and outputs the pseudo-random number signal S112 subjected to the limitation process, as a limiter signal S113. Like the pseudo-random number signal S112, the limiter signal S113 is also a digital signal. The limiter circuit 113 updates and outputs a value of the limiter signal S113 each time the value of the pseudo-random number signal S112 is updated (accordingly, based on the unit time $P_{PR}$ as a period).

The limitation process by the limiter circuit 113 is a process of limiting an amount of change per unit time $P_{PR}$ in the pseudo-random number signal S112. A maximum amount of change per unit time $P_{PR}$ in the pseudo-random number signal S112 output from the pseudo-random number generation circuit 112 is (HH2−LL2). In the limitation process by the limiter circuit 113, a magnitude of the amount of change per unit time $P_{PR}$ in the pseudo-random number signal S112 is limited to a predetermined limit value LIM or less, and the limited pseudo-random number signal S112 is output as the limiter signal S113. Here, the relationship "0<LIM<HH2−LL2" is established.

The limitation process will be further explained. A value of an n-th pseudo-random number signal S112 output from the pseudo-random number generation circuit 112 is represented by "S112[n]," and a value of an n-th limiter signal S113 output from the limiter circuit 113 is represented by "S113[n]," where n is any natural number (see FIG. 4). The limiter circuit 113 generates the value S113[n] based on the value S112[n]. Assuming a case CS1 where "S112[n]=S113[n]" is established for the values of the n-th signals S112 and S113, a relationship between values S112[n+1] and S113[n+1] will be described.

Figure 4:
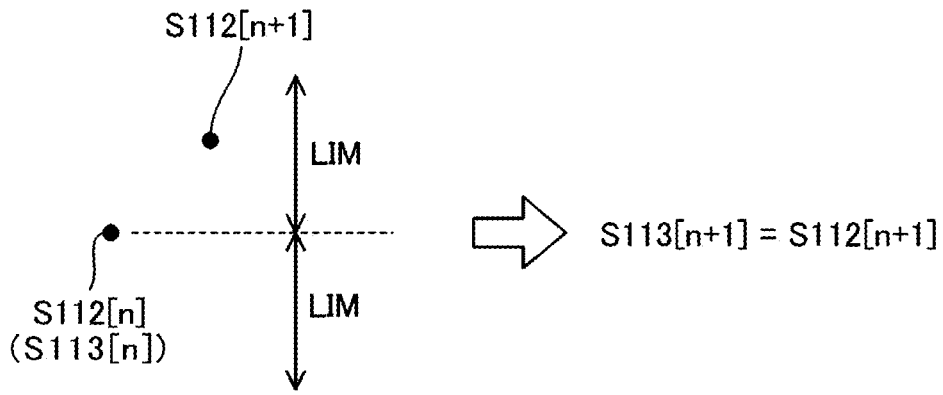
FIG. 4 is an operation explanatory diagram of a limiter circuit according to the first embodiment of the present disclosure.

As shown in FIG. 4, when a first inequality "|S112[n+1]−S112[n]|≤LIM" is established in the case CS1, "S113[n+1]=S112[n+1]" is established. When the first inequality is established, since the magnitude of amount of change per unit time $P_{PR}$ in the pseudo-random number signal S112 is equal to or less than the limit value LIM, no particular limit is imposed. In addition, in the case CS1, the first inequality is equivalent to the inequality "|S112[n+1]−S113[n]|≤LIM."

Figure 5:
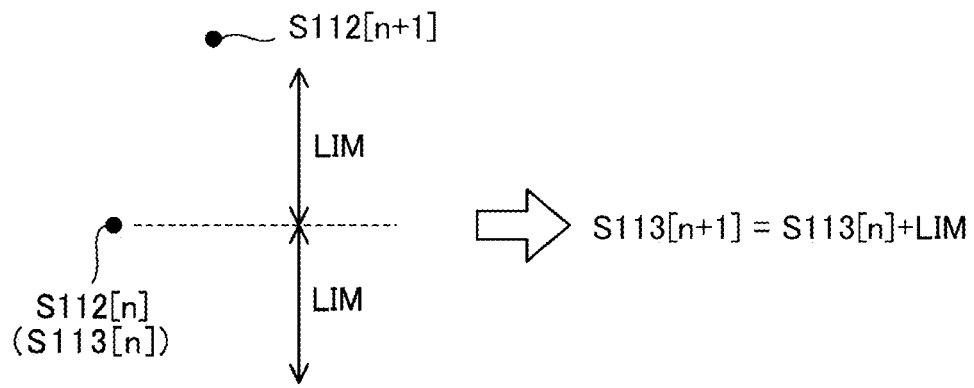
FIG. 5 is an operation explanatory diagram of the limiter circuit according to the first embodiment of the present disclosure.
Figure 6:
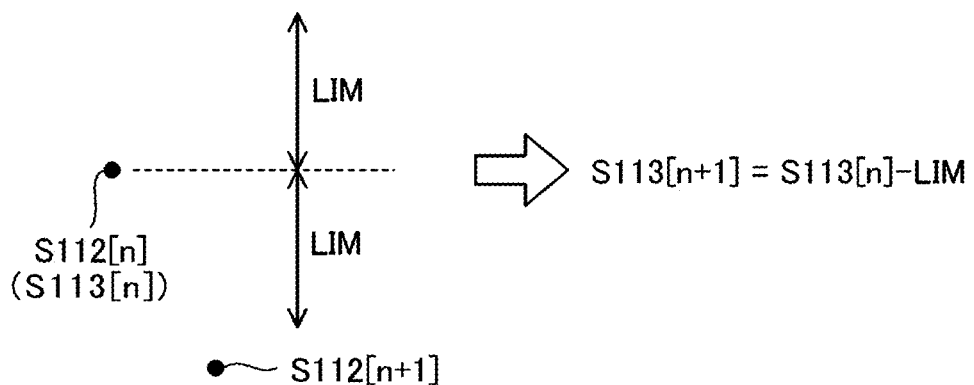
FIG. 6 is an operation explanatory diagram of the limiter circuit according to the first embodiment of the present disclosure.

As shown in FIG. 5, when a second inequality "(S112[n+1]−S112[n])>LIM" is established in the case CS1, "S113[n+1]=S113[n1]+LIM" is established. As shown in FIG. 6, when a third inequality "(S112[n]−S112[n+1])>>LIM" is established in the case CS1, "S113[n+1]=S113[n1]−LIM" is established. When the second or third inequality is established, since the magnitude of amount of change per unit time $P_{PR}$ in the pseudo-random number signal S112 exceeds the limit value LIM, a limit is imposed. In the case CS1, the second inequality is equivalent to the inequality "(S112[n+1]−S113[n])>>LIM," and the third inequality is equivalent to the inequality "(S113[n]−S112[n+1])>>LIM."

The limitation process by the limiter circuit 113 does not limit the amount of change in the signal S112 during a stage when the circuit 112 generates the signal S112, but limits the amount of change in the signal S112 after the signal S112 is output from the circuit 112. Accordingly, the amount of change per unit time $P_{PR}$ in the signal S112 may exceed the limit value LIM, while the amount of change per unit time $P_{PR}$ in the signal S113 is equal to or less than the limit value LIM. Therefore, it can be said that the limiter circuit 113 generates a signal based on the output of the pseudo-random number generation circuit 112 (that is, a signal based on the pseudo-random number signal S112 output from the pseudo-random number generation circuit 112), which is also a signal in which the amount of change per unit time $P_{PR}$ is limited to the limit value LIM or less, as the limiter signal S113. The amount of change per unit time $P_{PR}$ corresponds to a magnitude (absolute value) of change per unit time $P_{PR}$.

Referring to FIG. 1 again, the triangular wave signal S111 output from the triangular wave generation circuit 111 and the limiter signal S113 output from the limiter circuit 113 are input to the linear arithmetic circuit 114. The linear arithmetic circuit 114 generates a frequency control signal S114 by performing a linear arithmetic operation on the triangular wave signal S111 and the limiter signal S113. The generated frequency control signal S114 is output to the oscillator 120. The linear arithmetic circuit 114 updates and outputs a value of the frequency control signal S114 based on the unit time $P_{PR}$ as a period.

Here, it is assumed that the linear arithmetic operation by the linear arithmetic circuit 114 is an addition operation. In this case, in the linear arithmetic operation, the linear arithmetic circuit 114 adds one of the triangular wave signal S111 and the limiter signal S113 to the other one and generates and outputs an addition result as the frequency control signal S114. The frequency control signal S114 is a digital signal, and at any timing, the value of the frequency control signal S114 is represented by a sum of the value of the triangular wave signal S111 and the value of the limiter signal S113. However, when the sum exceeds a maximum value of a numerical range that can be represented by the frequency control signal S114 (a so-called overflow occurs), the value of the frequency control signal S114 is set to be the maximum value.

Figure 7:
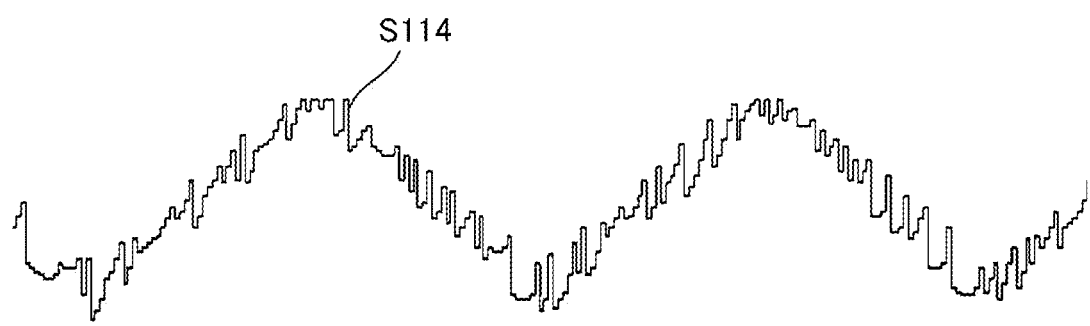
FIG. 7 is a waveform diagram of a frequency control signal according to the first embodiment of the present disclosure.

FIG. 7 shows an example of the frequency control signal S114. A signal having respective characteristics of the triangular wave signal S111 and the pseudo-random number signal S112 and having a limit in the amount of change per time (the amount of change per unit time $P_{PR}$) is generated as the frequency control signal S114.

The oscillator 120 includes a DAC 121 and a VCO 122, and generates and outputs a clock signal (a clock signal S122 to be described later) having a frequency corresponding to the frequency control signal S114.

The DAC 121 is a digital-analog converter. The frequency control signal S114 output from the linear arithmetic circuit 114 is input to the DAC 121. The DAC 121 performs a DA conversion process (digital/analog conversion process) for converting an input digital signal into an analog signal. Therefore, the DAC 121 converts the digital frequency control signal S114 into an analog frequency control signal S121 by the DA conversion process and outputs the analog frequency control signal S121. The frequency control signal S121 is a voltage signal and has an analog voltage value corresponding to the value of the frequency control signal S114. An execution cycle of the DA conversion process in the DAC 121 may be the same as the period $P_{PR}$.

The frequency control signal S121 output from the DAC 121 is input to the VCO 122. The VCO 122 is a voltage-controlled oscillator. The VCO 122 converts the frequency control signal S121 to a frequency f122, and generates and outputs the clock signal S122 having the frequency f122. The clock signal S122 is a signal that alternates between high and low signal levels. The frequency f122 increases as a voltage value of the frequency control signal S121 increases, and decreases as the voltage value of the frequency control signal S121 decreases. With a center frequency of the clock signal S122 as a reference, the frequency f122 is modulated (spread) according to the voltage value of the frequency control signal S121. In addition, the amount of change in the frequency f122 with respect to the amount of unit change in the voltage value of the frequency control signal S121 may be constant over an entire range of change in the frequency f122.

The power conversion circuit 130 receives an input voltage $V_{IN}$ from a voltage source (not shown), and performs DC/DC conversion of the input voltage $V_{IN}$ to generate and output an output voltage $V_{OUT}$. The input voltage $V_{IN}$ and the output voltage $V_{OUT}$ are DC voltages having different voltage values. The clock signal S122 is input to the power conversion circuit 130. The DC/DC converter 100 is a switching regulator, and the power conversion circuit 130 obtains the output voltage $V_{OUT}$ by switching the input voltage $V_{IN}$ using the frequency of the clock signal S122 as a switching frequency.

Figure 8:
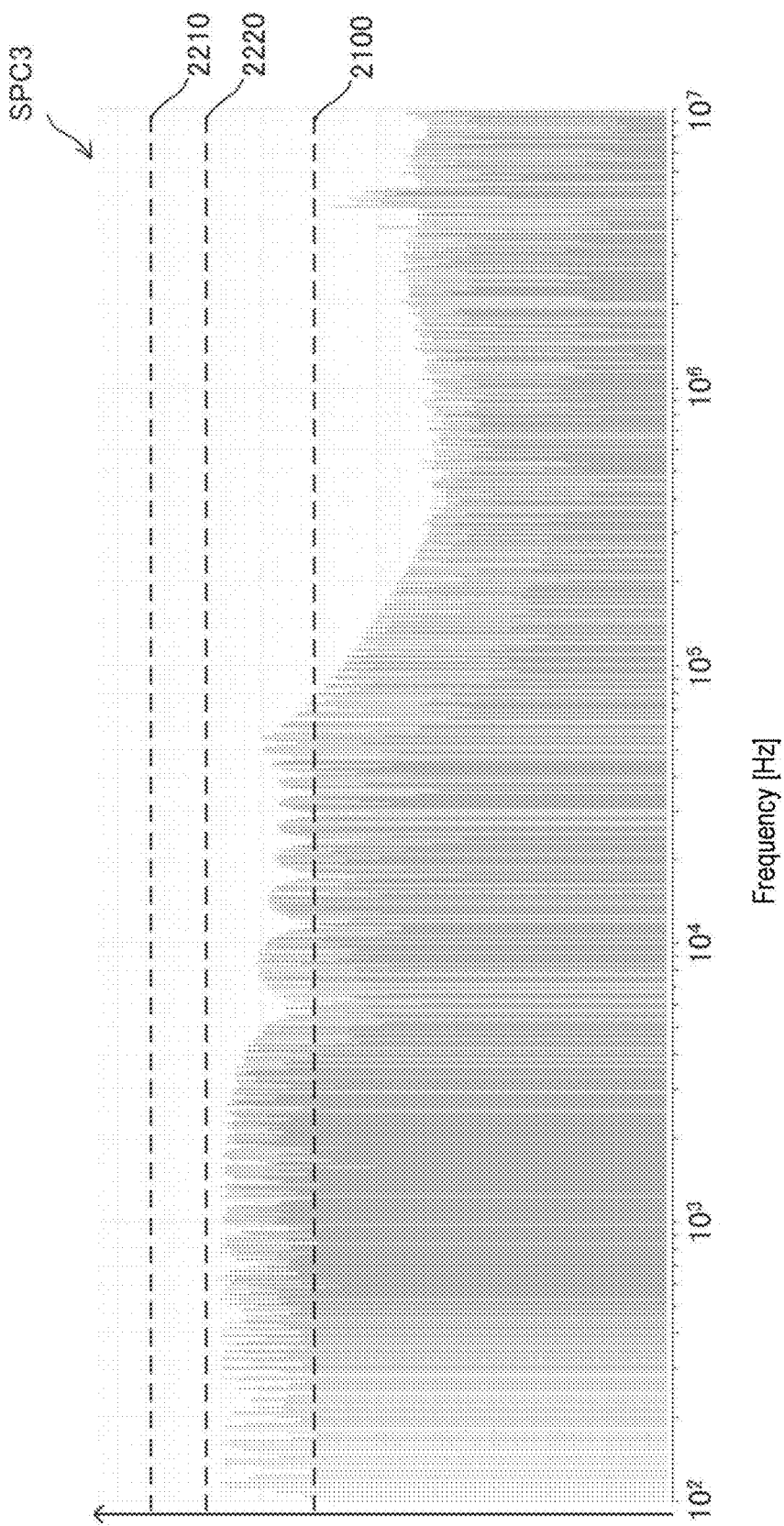
FIG. 8 is a diagram showing a power spectrum of radiation noise according to the first embodiment of the present disclosure.

FIG. 8 shows a power spectrum SPC3 of radiation noise generated in the DC/DC converter 100. Here, it is assumed that the center frequency of the clock signal is set to about 4.5 MHz, as in each of the above-described reference examples. It is also assumed that the frequency of the triangular wave signal S111 is set to about 1 kHz (kilohertz). The broken lines 2210 and 2220 shown in FIG. 8 are the same as those shown in FIG. 21 and are provided for comparison between FIG. 8 and FIG. 21.

As can be understood from the comparison between FIG. 8 and FIG. 21, it can be recognized that a power of a frequency component of the triangular wave and a power of a harmonic component of the triangular wave in the power spectrum of the radiation noise are reduced in the configuration of the present embodiment as compared with the above-described fourth reference example. Further, it can be recognized that a power in a vicinity of the switching frequency is also reduced as compared with each reference example. Thus, according to the present embodiment, the frequency of the clock signal can be spread satisfactorily, thereby reducing the radiation noise. At this time, it is possible to suppress the radiation noise caused by the modulation by the triangular wave and also to suppress the radiation noise that may occur due to a rapid change in the value of the pseudo-random number.

Example EX1_1

Example EX1_1 belonging to the first embodiment will be described. The linear arithmetic operation by the linear arithmetic circuit 114 may be a subtraction operation. In this case, in the linear arithmetic operation, the linear arithmetic circuit 114 subtracts one of the triangular wave signal S111 and the limiter signal S113 from the other one and generates and outputs a subtraction result as the frequency control signal S114. Basically, the limiter signal S113 may be subtracted from the triangular wave signal S111. In the following description, when the linear arithmetic operation is the subtraction operation, it is assumed that the limiter signal S113 is subtracted from the triangular wave signal S111 (the same applies to Example EX1_2, which will be described later). At any timing, the value of the frequency control signal S114 is a difference between the triangular wave signal S111 and the limiter signal S113, and the difference is a value obtained by subtracting the value of the limiter signal S113 from the value of the triangular wave signal S111. However, when the difference falls below the minimum value of the numerical range that can be represented by the frequency control signal S114 (a so-called underflow occurs), the value of the frequency control signal S114 is set to be the minimum value.

Example EX1_2

Example EX1_2 belonging to the first embodiment will be described. In Example EX1_2, specific examples regarding the signals S111 to S114 will be given.

In Example EX1_2, the triangular wave signal S111 is an 8-bit digital signal, and the pseudo-random number signal S112 is a 4-bit digital signal. Therefore, the triangular wave signal S111 has an integer value of 0 or more and 255 or less in decimal notation, and the pseudo-random number signal S112 has an integer value of 0 or more and 15 or less in decimal notation. That is, (LL1, HH1)=(0, 255) and (LL2, HH2)=(0, 15) (see FIGS. 2 and 3). However, the bit number of each of the triangular wave signal S111 and the pseudo-random number signal S112 can be arbitrarily changed. "LL2=1" may be possible.

The limit value LIM in the limiter circuit 113 satisfies the relationship of "(<LIM<HH2−LL2", and is "LIM=8" as an example. When "LIM=8," the amount of change per unit time $P_{PR}$ in the limiter signal S113, that is, the amount of change per time in the value of the limiter signal S113, is limited to 8 or less.

In Example EX1_2, the frequency control signal S114 is an 8-bit digital signal. Therefore, in decimal notation, the frequency control signal S114 has an integer value of 0 or more and 255 or less. That is, the numerical range that can be represented by the frequency control signal S114 is the range of 0 or more and 255 or less.

When the linear arithmetic operation in the linear arithmetic circuit 114 is an addition operation, the linear arithmetic circuit 114 adds one of the triangular wave signal S111 and the limiter signal S113 to the other one, and generates and outputs an addition result as the frequency control signal S114. When the sum of the value of the triangular wave signal S111 and the value of the limiter signal S113 exceeds the maximum value (here, 255) of the numerical range that can be represented by the frequency control signal S114, the value of the frequency control signal S114 is set to be the maximum value.

When the linear arithmetic operation in the linear arithmetic circuit 114 is a subtraction operation, the linear arithmetic circuit 114 subtracts one of the triangular wave signal S111 and the limiter signal S113 from the other one, and generates and outputs a subtraction result as the frequency control signal S114. When a difference between the triangular wave signal S111 and the limiter signal S113 (specifically, a value obtained by subtracting the value of the limiter signal S113 from the value of the triangular wave signal S111) is below the minimum value (here, 0) of the numerical range that can be represented by the frequency control signal S114, the value of the frequency control signal S114 is set to be the minimum value.

Further, the bit number of the frequency control signal S114 can be arbitrarily changed and may be larger than the bit number of the triangular wave signal S111.

Second Embodiment

Figure 9:
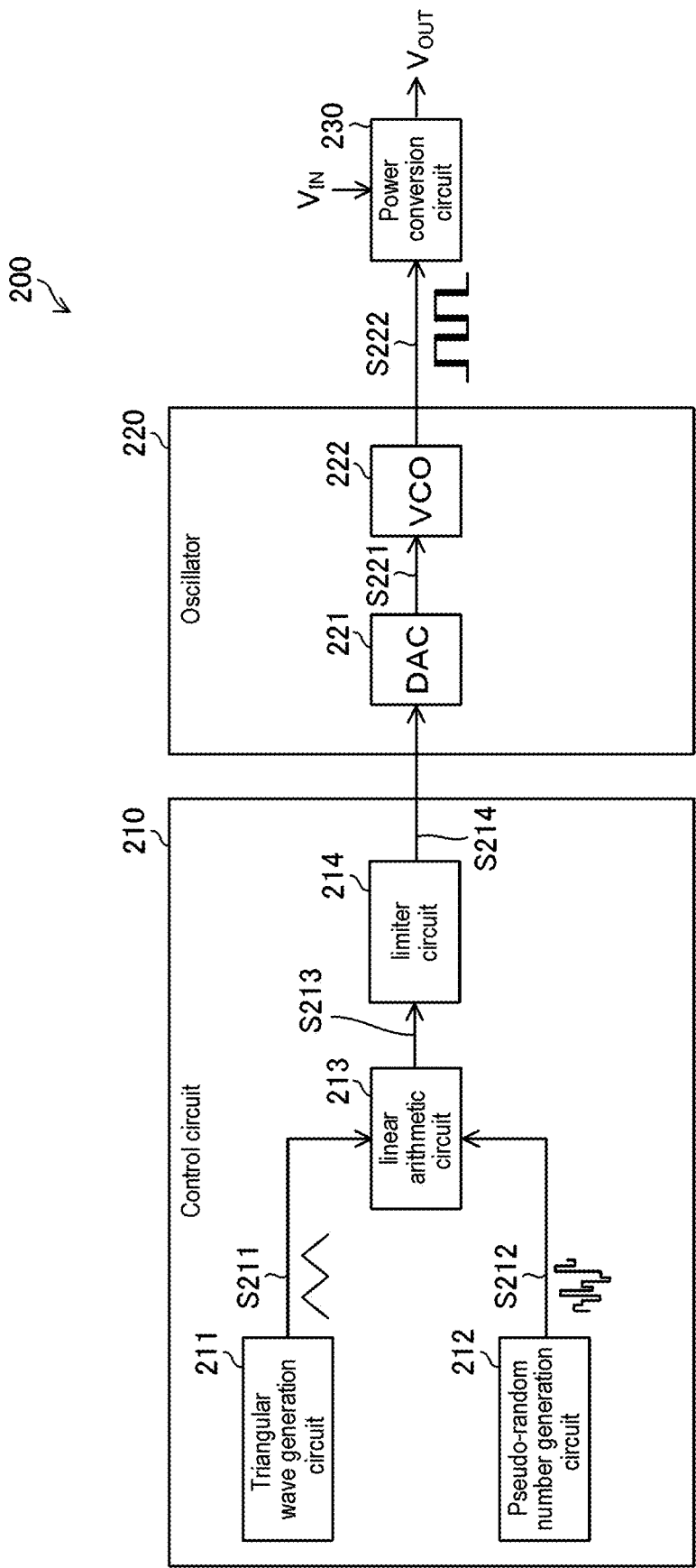
FIG. 9 is a configuration diagram of a DC/DC converter according to a second embodiment of the present disclosure.

A second embodiment of the present disclosure will be described. FIG. 9 is a configuration block diagram of a DC/DC converter (DC/DC converting device) 200 according to the second embodiment. The DC/DC converter 200 includes a control circuit 210 for SSCG (Spread Spectrum Clock Generator), an oscillator 220, and a power conversion circuit 230. The control circuit 210 and the oscillator 220 form a clock signal generation circuit that generates a frequency-spread clock signal. Here, it is considered that the DC/DC converter is formed by the clock signal generation circuit and the power conversion circuit 230, but it may be considered that the power conversion circuit 230 itself is the DC/DC converter and the clock signal generation circuit (210 and 220) is connected to the DC/DC converter.

The control circuit 210 includes a triangular wave generation circuit 211, a pseudo-random number generation circuit 212, a linear arithmetic circuit 213, and a limiter circuit 214.

The triangular wave generation circuit 211 generates and outputs a triangular wave signal. The triangular wave generation circuit 211 is the same as the triangular wave generation circuit 111 (see FIG. 1) shown in the first embodiment. However, the triangular wave signal generated by and output from the triangular wave generation circuit 211 is referred to as a triangular wave signal S211. The triangular wave signal S211 has the same characteristics as the triangular wave signal S111 shown in the first embodiment, and therefore, fluctuates between the minimum value LL1 and the maximum value HH1 at a predetermined period $P_{TRI}$ (see FIG. 2).

The pseudo-random number generation circuit 212 generates and outputs a pseudo-random number signal. The pseudo-random number generation circuit 212 is the same as the pseudo-random number generation circuit 112 (see FIG. 1) shown in the first embodiment. However, the pseudo-random number signal generated by and output from the pseudo-random number generation circuit 212 is referred to as a pseudo-random number signal S212. The pseudo-random number signal S212 has the same characteristics as the pseudo-random number signal S112 shown in the first embodiment. Therefore, the minimum value and the maximum value of the pseudo-random number signal S212 are LL2 and HH2, respectively (see FIG. 3). The pseudo-random number generation circuit 212 updates and outputs a value of the pseudo-random number signal S212 based on the unit time $P_{PR}$ as a period (that is, each time the unit time $P_{PR}$ elapses).

The triangular wave signal S211 output from the triangular wave generation circuit 211 and the pseudo-random number signal S212 output from the pseudo-random number generation circuit 212 are input to the linear arithmetic circuit 213. The linear arithmetic circuit 213 generates a linear arithmetic result signal S213 by performing a linear arithmetic operation on the triangular wave signal S211 and the pseudo-random number signal S212. The generated linear arithmetic result signal S213 is output to the limiter circuit 214. The linear arithmetic circuit 213 updates a value of the linear arithmetic result signal S213 each time a value of the pseudo-random number signal S212 is updated. That is, the linear arithmetic circuit 213 updates and outputs the value of the linear arithmetic result signal S213 based on the unit time $P_{PR}$ as a period.

Here, it is assumed that the linear arithmetic operation by the linear arithmetic circuit 213 is an addition operation. In this case, in the linear arithmetic operation, the linear arithmetic circuit 213 adds one of the triangular wave signal S211 and the pseudo-random number signal S212 to the other one, and generates and outputs an addition result as the linear arithmetic result signal S213. The linear arithmetic result signal S213 is a digital signal, and at any timing, the value of the linear arithmetic result signal S213 is represented by a sum of the value of the triangular wave signal S211 and the value of the pseudo-random number signal S212. However, when the sum exceeds the maximum value of a numerical range that can be represented by the linear arithmetic result signal S213 (a so-called overflow occurs), the value of the linear arithmetic result signal S213 is set to be the maximum value.

The linear arithmetic result signal S213 output from the linear arithmetic circuit 213 is input to the limiter circuit 214. The limiter circuit 214 performs a limitation process on the input linear arithmetic result signal S213, and generates and outputs the linear arithmetic result signal S213 subjected to the limitation processing as a signal S214. The signal S214 is a frequency control signal. However, as in the first embodiment, the signal S214 can also be called a limiter signal. Similar to the linear arithmetic result signal S213, the frequency control signal S214 is also a digital signal. The limiter circuit 214 updates a value of the frequency control signal S214 each time the value of the linear arithmetic result signal S213 is updated. That is, the limiter circuit 214 updates and outputs the value of the frequency control signal S214 based on the unit time $P_{PR}$ as a period.

The limitation process by the limiter circuit 214 is a process of limiting an amount of change per unit time $P_{PR}$ in the linear arithmetic result signal S213. Assuming that the value of the signal S211 remains unchanged, the amount of change per unit time $P_{PR}$ in the linear arithmetic result signal S213 is (HH2-LL2) at maximum. In the limitation process by the limiter circuit 214, a magnitude of the amount of change per unit time $P_{PR}$ in the linear arithmetic result signal S213 is limited to a predetermined limit value LIM or less, and the limited linear arithmetic result signal S213 is output as the frequency control signal S214. Here, the relationship "(<LIM<HH2-LL2" is established.

The limitation process will be further explained. A value of an n-th linear arithmetic result signal S213 output from the linear arithmetic circuit 213 is represented by "S213[n]," and a value of an n-th frequency control signal S214 output from the limiter circuit 214 is represented by "S214[n]," where n is any natural number (see FIG. 10). The limiter circuit 214 generates the value S214[n] based on the value S213[n]. Assuming a case CS2 where "S213[n]=S214[n]" is established for the values of the n-th signals S213 and S214, a relationship between values S213[n+1] and S214[n+1] will be described.

Figure 10:
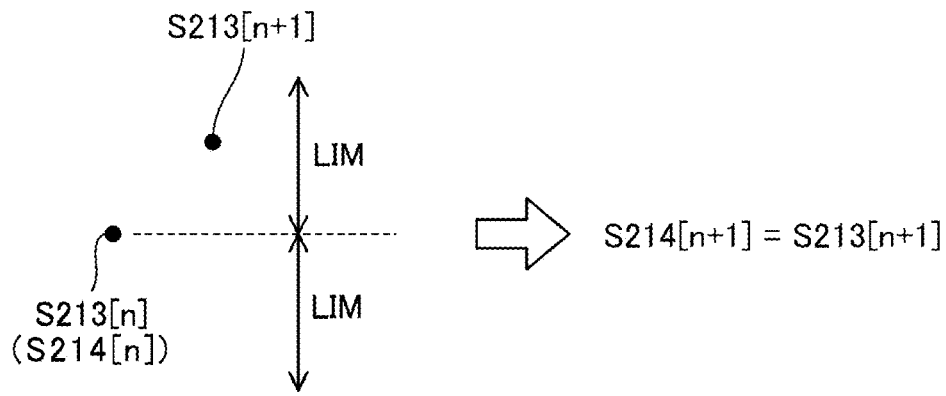
FIG. 10 is an operation explanatory diagram of a limiter circuit according to the second embodiment of the present disclosure.

As shown in FIG. 10, when a fourth inequality "|S213[n+1]−S213[n]|≤LIM" is established in the case CS2, "S214[n+1]=S213[n+1]" is established. When the fourth inequality is established, since the magnitude of the amount of change per unit time $P_{PR}$ in the linear arithmetic result signal S213 is equal to or less than the limit value LIM, no particular limit is imposed. In addition, in the case CS2, the fourth inequality is equivalent to the inequality "|S213[n+1]−S214[n]|≤LIM."

Figure 11:
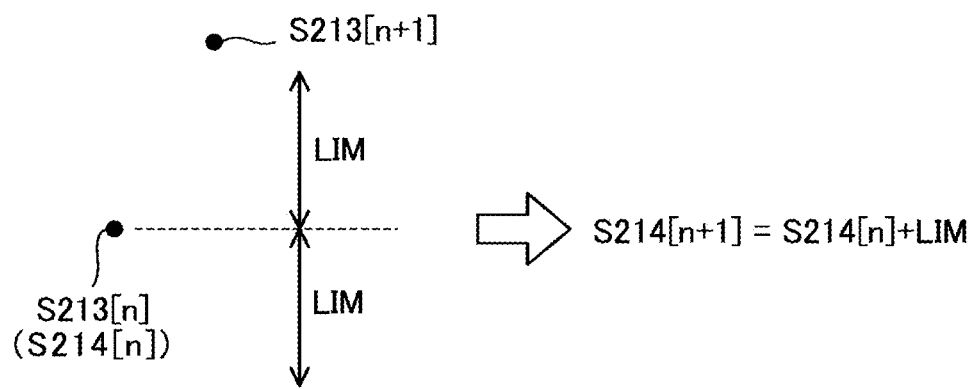
FIG. 11 is an operation explanatory diagram of the limiter circuit according to the second embodiment of the present disclosure.
Figure 12:
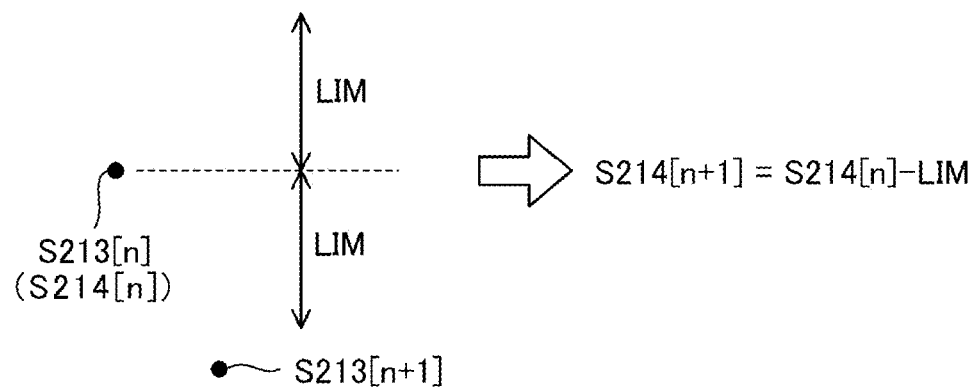
FIG. 12 is an operation explanatory diagram of the limiter circuit according to the second embodiment of the present disclosure.

As shown in FIG. 11, when a fifth inequality "(S213[n+1]−S213[n])>LIM" is established in the case CS2, "S214[n+1]=S214[n1]+LIM" is established. As shown in FIG. 12, when a sixth inequality "(S213[n]−S213[n+1])>LIM" is established in the case CS2, "S214[n+1]=S214[n1]−LIM" is established. When the fifth or sixth inequality is established, since the magnitude of the amount of change per unit time $P_{PR}$ in the linear arithmetic result signal S213 exceeds the limit value LIM, a limit is imposed. In the case CS2, the fifth inequality is equivalent to the inequality "(S213[n+1]−S214[n])>LIM," and the sixth inequality is equivalent to the inequality "(S214[n]−S213[n+1])>LIM."

The limitation process by the limiter circuit 214 does not limit the amount of change in the signal S213 during a stage when the circuit 213 generates the signal S213, but limits the amount of change in the signal S213 after the signal S213 is output from the circuit 213. Accordingly, the amount of change per unit time $P_{PR}$ in the signal S213 may exceed the limit value LIM, while the amount of change per unit time $P_{PR}$ in the signal S214 is equal to or less than the limit value LIM. Therefore, it can be said that the limiter circuit 214 generates a signal based on the output of the linear arithmetic circuit 213 (that is, a signal based on the linear arithmetic result signal S213 output from the linear arithmetic circuit 213), which is also a signal in which the amount of change per unit time $P_{PR}$ is limited to the limit value LIM or less, as the frequency control signal S214. The amount of change per unit time $P_{PR}$ corresponds to the magnitude (absolute value) of change per unit time $P_{PR}$.

The frequency control signal S214 is a signal similar to the frequency control signal S114 shown in FIG. 7. A signal having respective characteristics of the triangular wave signal S211 and the pseudo-random number signal S212 and having a limit in the amount of change per unit time (the amount of change per unit time $P_{PR}$) is generated as the frequency control signal S214.

The oscillator 220 includes a DAC 221 and a VCO 222, and generates and outputs a clock signal (a clock signal S222 to be described later) having a frequency corresponding to the frequency control signal S214. The DAC 221 and the VCO 222 may be the same as the DAC 121 and the VCO 122 shown in the first embodiment (see FIG. 1), respectively, but operations and configurations of the DAC 221 and the VCO 222 will be described in relation to the frequency control signal S214.

The DAC 221 is a digital-analog converter. The frequency control signal S214 output from the limiter circuit 214 is input to the DAC 221. The DAC 221 performs a DA conversion process (digital/analog conversion process) for converting an input digital signal into an analog signal. Therefore, the DAC 221 converts the digital frequency control signal S214 into an analog frequency control signal S221 by the DA conversion process and outputs the analog frequency control signal S221. The frequency control signal S221 is a voltage signal and has an analog voltage value corresponding to the value of the frequency control signal S214. An execution cycle of DA conversion process in the DAC 221 may be the same as the period $P_{PR}$.

The frequency control signal S221 output from the DAC 221 is input to the VCO 222. The VCO 222 is a voltage-controlled oscillator. The VCO 222 converts the frequency control signal S221 to a frequency f222, and generates and outputs the clock signal S222 having the frequency f222. The clock signal S222 is a signal that alternates between high and low signal levels. The frequency f222 increases as a voltage value of the frequency control signal S221 increases, and decreases as the voltage value of the frequency control signal S221 decreases. With a center frequency of the clock signal S222 as a reference, the frequency f222 is modulated (spread) according to the voltage value of the frequency control signal S221. In addition, the amount of change in the frequency f222 with respect to the amount of unit change in the voltage value of the frequency control signal S221 may be constant over an entire range of change in the frequency f222.

The power conversion circuit 230 receives an input voltage $V_{IN}$ from a voltage source (not shown), and performs DC/DC conversion of the input voltage $V_{IN}$ to generate and output an output voltage $V_{OUT}$. The input voltage $V_{IN}$ and the output voltage $V_{OUT}$ are DC voltages having different voltage values. The clock signal S222 is input to the power conversion circuit 230. The DC/DC converter 200 is a switching regulator, and the power conversion circuit 230 obtains the output voltage $V_{OUT}$ by switching the input voltage $V_{IN}$ using the frequency of the clock signal S222 as a switching frequency.

With the configuration according to the second embodiment, the same operative effects as those of the first embodiment can be obtained.

Example EX2_1

Example EX2_1 belonging to the second embodiment will be described. The linear arithmetic operation by the linear arithmetic circuit 213 may be a subtraction operation. In this case, in the linear arithmetic operation, the linear arithmetic circuit 213 subtracts one of the triangular wave signal S211 and the pseudo-random number signal S212 from the other one, and generates and outputs a subtraction result as the linear arithmetic result signal S213. Basically, the pseudo-random number signal S212 may be subtracted from the triangular wave signal S211. In the following description, when the linear arithmetic operation is the subtraction operation, it is assumed that the pseudo-random number signal S212 is subtracted from the triangular wave signal S211 (the same applies to Example EX2_2, which will be described later). At any timing, the value of the linear arithmetic result signal S213 is a difference between the triangular wave signal S211 and the pseudo-random number signal S212, and the difference is a value obtained by subtracting the value of the pseudo-random number signal S212 from the value of the triangular wave signal S211. However, when the difference falls below the minimum value of the numerical range that can be represented by the linear arithmetic result signal S213 (a so-called underflow occurs), the value of the linear arithmetic result signal S213 is set to be the minimum value.

Example EX2_2

Example EX2_2 belonging to the second embodiment will be described. In Example EX2_2, specific examples regarding the signals S211 to S214 will be given.

In Example EX2_2, the triangular wave signal S211 is an 8-bit digital signal, and the pseudo-random number signal S212 is a 4-bit digital signal. Therefore, the triangular wave signal S211 has an integer value of 0 or more and 255 or less in decimal notation, and the pseudo-random number signal S212 has an integer value of 0 or more and 15 or less in decimal notation. That is, (LL1, HH1)=(0, 255) and (LL2, HH2)=(0, 15). However, the bit number of each of the triangular wave signal S211 and the pseudo-random number signal S212 can be arbitrarily changed. "LL2=1" may be possible In Example EX2_2, each of the linear arithmetic result signal S213 and the frequency control signal S214 is an 8-bit digital signal. Therefore, each of the signals S213 and S214 has an integer value of 0 or more and 255 or less in decimal notation. That is, each of the numerical range that can be represented by the signal S213 and the numerical range that can be represented by the signal S214 is in the range of 0 or more and 255 or less.

When the linear arithmetic operation in the linear arithmetic circuit 213 is an addition operation, the linear arithmetic circuit 213 adds one of the triangular wave signal S211 and the pseudo-random number signal S212 to the other one, and generates and outputs an addition result as the linear arithmetic result signal S213. When the sum of the value of the triangular wave signal S211 and the value of the pseudo-random number signal S212 exceeds the maximum value (here, 255) of the numerical range that can be represented by the linear arithmetic result signal S213, the value of the linear arithmetic result signal S213 is set to be the maximum value.

When the linear arithmetic operation in the linear arithmetic circuit 213 is a subtraction operation, the linear arithmetic circuit 213 subtracts one of the triangular wave signal S211 and the pseudo-random number signal S212 from the other one, and generates and outputs a subtraction result as the linear arithmetic result signal S213. When a difference between the triangular wave signal S211 and the pseudo-random number signal S212 (specifically, a value obtained by subtracting the value of the pseudo-random number signal S212 from the value of the triangular wave signal S211) is below the minimum value (here, 0) of the numerical range that can be represented by the linear arithmetic result signal S213, the value of the linear arithmetic result signal S213 is set to be the minimum value.

The limit value LIM in the limiter circuit 214 satisfies the relationship of "(<LIM<HH2−LL2," and is "LIM=8" as an example. When "LIM=8," the amount of change per unit time $P_{PR}$ in the frequency control signal S214, that is, the amount of change per unit time in the value of the frequency control signal S214, is limited to 8 or less.

Further, the bit number of the linear arithmetic result signal S213 can be arbitrarily changed and may be larger than the bit number of the triangular wave signal S211. The same applies to the frequency control signal S214.

Third Embodiment

Figure 13:
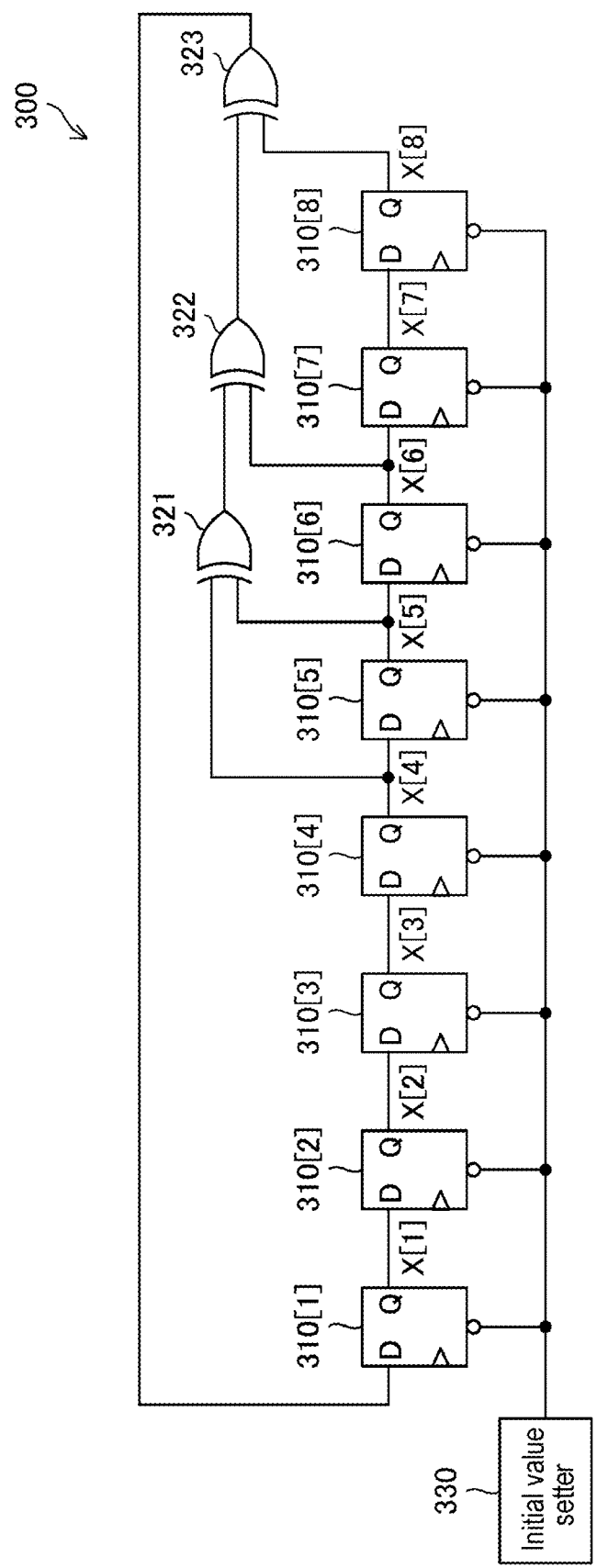
FIG. 13 is a configuration diagram of a linear feedback register according to a third embodiment of the present disclosure.

A third embodiment of the present disclosure will be described. Any linear feedback register can be used to form the pseudo-random number generation circuits 112 and 212. FIG. 13 shows a pseudo-random number generation circuit 300 as an example of the pseudo-random number generation circuit 112 or 212. The pseudo-random number generation circuit 300 is a linear feedback register including D-type flip-flops (hereinafter referred to as DFFs) 310[1] to 310[8], exclusive OR circuits (hereinafter referred to as XORs) 321 to 323, and an initial value setter 330.

Each DFF has a D input terminal, a Q output terminal, a clock input terminal, and a reset input terminal. The DFF holds a value of a signal supplied to the D input terminal in synchronization with an up-edge (or down-edge) of a synchronous clock signal input to the clock input terminal. The DFF outputs a signal indicating the held value from the Q output terminal. A common synchronous clock signal (not shown) is supplied to the DFFs 310[1] to 310[8]. A signal output from the Q output terminal of the DFF 310[i] is represented by a symbol "X[i]." The signal X[i] takes a value of "0" or "1," where i represents any natural number.

For an integer i that satisfies "1≤i≤7," an output signal X[i] of the DFF 310[i] is input to the D input terminal of the DFF 310[i+1]. The XOR 321 outputs a signal indicating the exclusive OR of the output signal X[4] of the DFF 310[4] and the output signal X[5] of the DFF 310[5]. The XOR 322 outputs a signal indicating the exclusive OR of the output signal of the XOR 321 and the output signal X[6] of the DFF 310[6]. The XOR 323 outputs a signal indicating the exclusive OR of the output signal of the XOR 322 and the output signal X[8] of the DFF 310[8]. The output signal of the XOR 323 is input to the D input terminal of the DFF 310[1].

An 8-bit digital signal is formed by the signals X[1] to X[8]. In a multi-bit digital signal, a signal X[i+1] indicates a value of a higher bit than a signal X[i]. Therefore, in the 8-bit digital signal, the signal X[1] indicates the value of the least significant bit and the signal X[8] indicates the value of the most significant bit. The initial value setter 330 sets an initial value (here, "1" in decimal notation) of the 8-bit digital signal. With an input of a predetermined start trigger to the pseudo-random number generation circuit 300, the initial value is set for the 8-bit digital signal, and thereafter, the value of the 8-bit digital signal is updated with a period of the synchronous clock signal. A feedback polynomial in the pseudo-random number generation circuit 300 is expressed as "X8+X6+X5+X4+1."

A digital signal of any bit number extracted from the 8-bit digital signal can be used as the pseudo-random number signal S112 or S212 (see FIG. 1 or FIG. 9). For example, when the pseudo-random number signal S112 is a 4-bit digital signal as in the above Example EX1_2, a digital signal composed of the signals X[1] to X[4] may be used as the pseudo-random number signal S112. Similarly, for example, when the pseudo-random number signal S212 is a 4-bit digital signal as in the above Example EX2_2, a digital signal composed of the signals X[1] to X[4] may be used as the pseudo-random number signal S212.

Fourth Embodiment

A fourth embodiment of the present disclosure will be described. In the fourth embodiment, a configuration example of a DC/DC converter using the clock signal generation circuit according to the first or second embodiment will be described.

Figure 14:
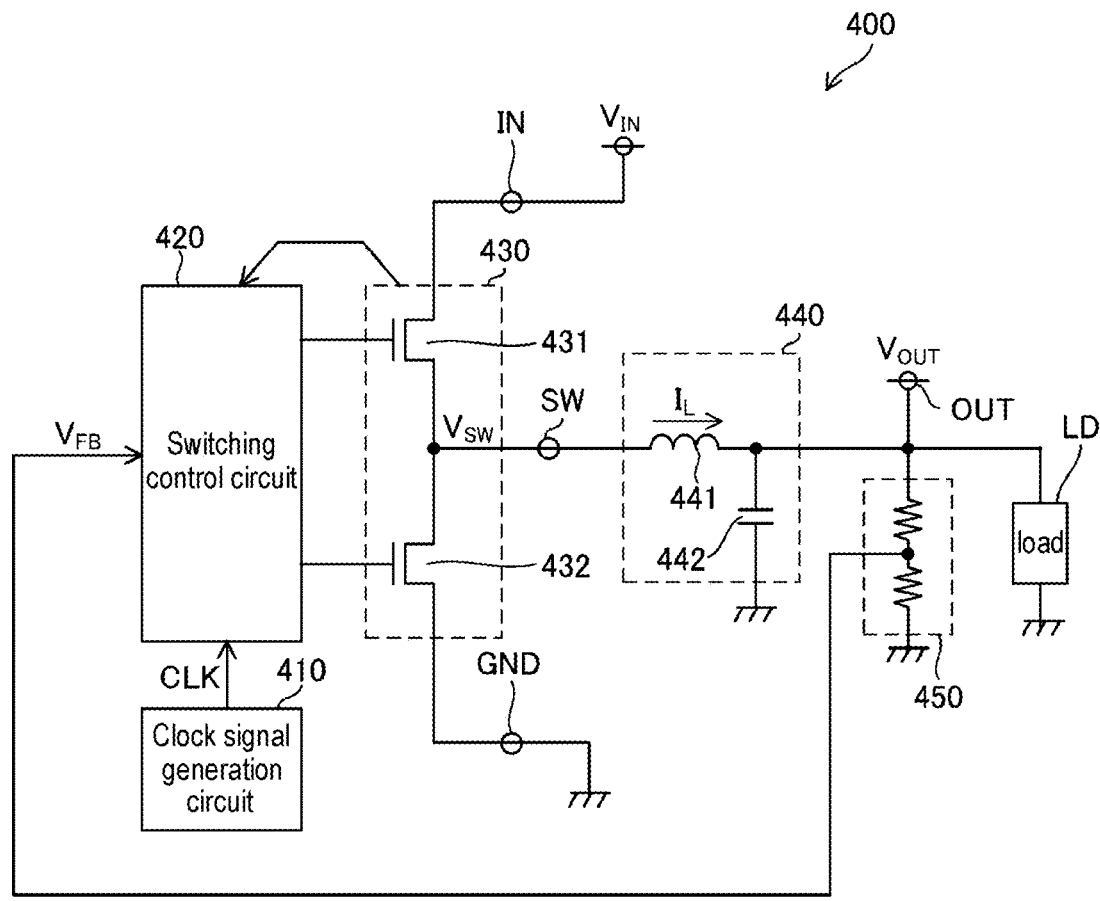
FIG. 14 is a configuration diagram of a DC/DC converter according to a fourth embodiment of the present disclosure.

FIG. 14 is a configuration diagram of a DC/DC converter 400 according to the fourth embodiment. The DC/DC converter 400 is configured as a step-down DC/DC converter that converts a power of an input voltage $V_{IN}$ to generate an output voltage $V_{OUT}$ that is lower than the input voltage $V_{IN}$. The input voltage $V_{IN}$ and the output voltage $V_{OUT}$ are positive DC voltages. The DC/DC converter 400 is provided with an input terminal IN to which the input voltage $V_{IN}$ is applied, an output terminal OUT to which the output voltage $V_{OUT}$ is applied, a ground terminal GND having a ground potential, and a switch terminal SW to which a switch voltage $V_{SW}$ to be described later is applied. The ground terminal GND and the switch terminal SW are provided on a lower potential side than the input terminal IN.

The DC/DC converter 400 includes a clock signal generation circuit 410, a switching control circuit 420, an output stage circuit 430, a rectifying/smoothing circuit 440, and a feedback voltage generation circuit 450.

The clock signal generation circuit 410 supplies a clock signal CLK to the switching control circuit 420. The clock signal generation circuit 410 may include the control circuit 110 and the oscillator 120 (see FIG. 1) in the first embodiment, in which case the clock signal S122 from the oscillator 120 becomes the clock signal CLK. Alternatively, the clock signal generation circuit 410 may include the control circuit 210 and the oscillator 220 (see FIG. 9) in the second embodiment, in which case the clock signal S222 from the oscillator 220 becomes the clock signal CLK. The circuits 420, 430, 440, and 450 constitute a power conversion circuit corresponding to the above-described power conversion circuit 130 or 230 (see FIG. 1 or FIG. 9). In the DC/DC converter 400, the power conversion circuit generates the output voltage $V_{OUT}$ by switching the input voltage $V_{IN}$ at a switching frequency corresponding to the clock signal CLK.

Figure 15:
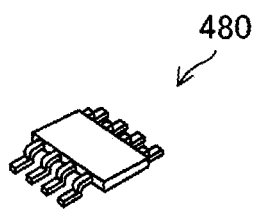
FIG. 15 is an external perspective view of a semiconductor device according to the fourth embodiment of the present disclosure.

The DC/DC converter 400 can be configured using a semiconductor device. FIG. 15 shows an example of an appearance of a semiconductor device 480. The semiconductor device 480 is an electronic component, which includes a semiconductor chip having a semiconductor integrated circuit formed on a semiconductor substrate, a housing (package) accommodating the semiconductor chip, and a plurality of external terminals exposed from the housing to the outside of the semiconductor device 480. The semiconductor device 480 is formed by enclosing the semiconductor chip in the housing (package) made of resin. The circuits 410, 420, and 430 may be included in the semiconductor integrated circuit. The circuits 440 and 450 may be provided external to the semiconductor device 480. However, the circuit 450 may be provided within the semiconductor device 480.

The output stage circuit 430 includes a half bridge circuit composed of a series circuit of a high-side transistor 431 and a low-side transistor 432. The rectifying/smoothing circuit 440 includes an inductor 441 and an output capacitor 442.

The DC/DC converter 400 uses the transistors 431 and 432 to perform DC/DC conversion in a synchronous rectification manner. The transistors 431 and 432 are configured as N-channel MOSFETs. A modification is also possible in which the transistor 431 is configured as a P-channel MOSFET. Further, the transistor 432 can be replaced with a diode, in which case the DC/DC converter 400 performs DC/DC conversion in an asynchronous rectification manner.

A drain of the transistor 431 is connected to the input terminal IN and thus receives the input voltage $V_{IN}$. A source of the transistor 431 and a drain of the transistor 432 are connected in common to the switch terminal SW. A source of the transistor 432 is connected to the ground terminal GND (that is, connected to the ground). A voltage applied to the switch terminal SW is called a switch voltage and is indicated by a symbol "$V_{SW}$." The switch terminal SW is connected to one end of the inductor 441, the other end of the inductor 441 is connected to the output terminal OUT, and the output voltage $V_{OUT}$ is generated at the output terminal OUT. The output capacitor 442 is connected between the output terminal OUT and the ground.

In FIG. 14, "LD" represents a load connected between the output terminal OUT and the ground. The load LD is any load driven based on the output voltage $V_{OUT}$. A current flowing through the inductor 441 is called an inductor current and is indicated by a symbol "$I_L$."

The feedback voltage generation circuit 450 generates a divided voltage of the output voltage $V_{OUT}$ using a series circuit of a plurality of resistors arranged between the output terminal OUT and the ground, and supplies the generated divided voltage to the switching control circuit 420, as a feedback voltage $V_{FB}$. However, it is also possible to use the output voltage $V_{OUT}$ itself as the feedback voltage $V_{FB}$, in which case the feedback voltage generation circuit 450 is eliminated from the DC/DC converter 400.

A state of the output stage circuit 430 is controlled and set by the switching control circuit 420 to any one of an output high state, an output low state, and a both off state. In the output high state, the transistor 431 is in an on state and the transistor 432 is in an off state. In the output low state, the transistor 431 is in an off state and the transistor 432 is in an on state. In the both off state, both the transistors 431 and 432 are in the off state. There is no occasion for both transistors 431 and 432 to be in the on state simultaneously.

The switching control circuit 420 performs a switching control to alternately turn the transistors 431 and 432 on and off (that is, switch the state of the output stage circuit 430 between the output high state and the output low state) based on information on the output voltage $V_{OUT}$ (that is, the feedback voltage $V_{FB}$) and information on the inductor current $I_L$, so that the output voltage $V_{OUT}$ is stabilized at a predetermined target voltage $V_{TG}$. That is, the switching control circuit 420 is configured to be capable of driving the transistors 431 and 432 in a so-called current mode control method. For example, a current flowing through the transistor 431 during an on period of the transistor 431 can be used as the information on the inductor current $I_L$. In the switching control by the switching control circuit 420, alternately turning the transistors 431 and 432 on and off is a concept that includes the both off state interposed during transition between the output low state and the output high state in consideration of a dead time and the like.

Due to the switching control described above, a rectangular wave voltage having a level substantially fluctuating between a level of the input voltage $V_{IN}$ and a level of the ground appears as the switch voltage $V_{SW}$. The switch voltage $V_{SW}$ is rectified and smoothed by the rectifying/smoothing circuit 440, so that the DC output voltage $V_{OUT}$ is obtained.

The switching control circuit 420 determines a switching frequency of the transistors 431 and 432 based on the clock signal CLK output from the clock signal generation circuit 410. Specifically, the switching control circuit 420 performs a unit operation to switch the state of the output stage circuit 430 from the output low state to the output high state in synchronization with an up-edge of the clock signal CLK and then switch the state of the output stage circuit 430 from the output high state to the output low state based on another signal (not shown). This unit operation is repeated by the switching control. The switching control circuit 420 generates the another signal based on the information on the output voltage $V_{OUT}$ (that is, the feedback voltage $V_{FB}$) and the information on the inductor current $I_L$. That is, the switching control circuit 420 controls the switching frequency of the transistors 431 and 432 based on the clock signal CLK and controls an output duty based on the another signal. The output duty represents a ratio of a period in which the output stage circuit 430 is in the output high state to a sum of a period in which the output stage circuit 430 is in the output high state and a period in which the output stage circuit 430 is in the output low state. Therefore, the switching control of the switching control circuit 420 corresponds to a PWM control (pulse width modulation control).

Here, it has been explained that the state of the output stage circuit 430 is controlled by the current mode control method based on the information on the output voltage $V_{OUT}$ (that is, the feedback voltage $V_{FB}$) and the information on the inductor current $I_L$. However, the switching control circuit 420 may adopt a method of controlling the state of the output stage circuit 430 based on the information on the output voltage $V_{OUT}$ (that is, the feedback voltage $V_{FB}$) without referring to the information on the inductor current $I_L$.

Further, although the DC/DC converter 400 configured as the step-down DC/DC converter is taken as an example, the DC/DC converter 400 may also be configured as a step-up DC/DC converter or a step-up/down DC/DC converter.

Fifth Embodiment

A fifth embodiment of the present disclosure will be described. The clock signal generation circuit shown in the first or second embodiment can be applied not only to the DC/DC converter but also to any device that requires a clock signal.

Figure 16:
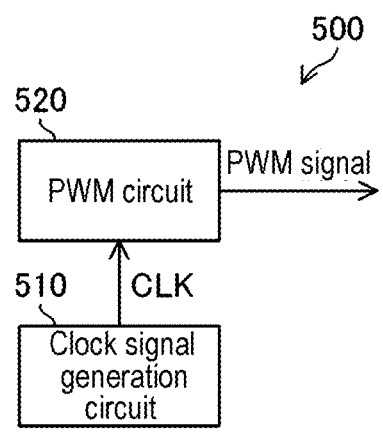
FIG. 16 is a configuration diagram of a PWM signal generator according to a fifth embodiment of the present disclosure.

For example, a PWM signal generator 500 shown in FIG. 16 can be configured. PWM is an abbreviation for pulse width modulation. The PWM signal generator 500 includes a clock signal generation circuit 510 and a PWM circuit 520.

The clock signal generation circuit 510 supplies a clock signal CLK to the PWM circuit 520. The clock signal generation circuit 510 may include the control circuit 110 and the oscillator 120 (see FIG. 1) in the first embodiment, in which case the clock signal S122 from the oscillator 120 becomes the clock signal CLK. Alternatively, the clock signal generation circuit 510 may include the control circuit 210 and the oscillator 220 (see FIG. 9) in the second embodiment, in which case the clock signal S222 from the oscillator 220 becomes the clock signal CLK.

The PWM circuit 520 generates and outputs a PWM signal based on the clock signal CLK. The PWM signal is a signal having a pulse width modulated in the unit of one cycle of the clock signal CLK. Specifically, the PWM signal is a rectangular wave signal having a predetermined frequency and alternating between a high signal level and a low signal level. In each cycle of the PWM signal, a period during which the signal level of the PWM signal is high is the pulse width. The PWM circuit 520 can adjust the pulse width of the PWM signal in the unit of a length of one cycle of the clock signal CLK. That is, the pulse width of the PWM signal is set to be a length of p cycles of the clock signal CLK (p is a natural number), and the PWM circuit 520 can adjust the pulse width of the PWM signal by setting the value of p arbitrarily.

In any device having the PWM signal generator 500, the PWM signal can be used in a variety of ways. As an example, there is a way of usage in which the PWM signal generator 500 is incorporated in a power supply device that generates an output voltage from an input voltage and the output voltage is adjusted according to the pulse width of the PWM signal.

Sixth Embodiment

Figure 17:
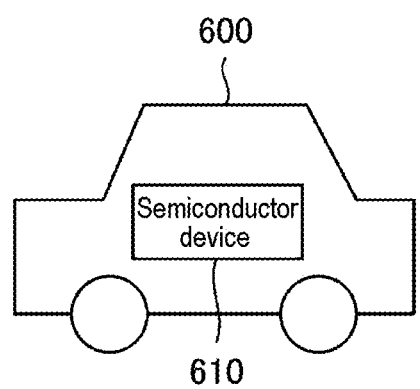
FIG. 17 is a diagram showing a state in which a semiconductor device is installed in a vehicle according to a sixth embodiment of the present disclosure.

A sixth embodiment of the present disclosure will be described. As shown in FIG. 17, a semiconductor device 610 having the clock signal generation circuit shown in the first or second embodiment may be mounted on a vehicle 600 such as an automobile. The semiconductor device 480 of FIG. 15 is an example of the semiconductor device 610 of FIG. 17. The vehicle 600 includes, in addition to the semiconductor device 610, an engine (not shown) that generates power for running the vehicle 600, a battery (not shown) composed of a secondary battery, and the like. The engine includes an internal combustion engine or a motor. The semiconductor device 610 is driven based on an output voltage of the battery. The semiconductor device 610 may be incorporated in an ECU (Electronic Control Unit) mounted on the vehicle 600. The ECU incorporating the semiconductor device 610 may be, for example, a device that controls the running of the vehicle 600, or a device that controls any electrical component (an audio device, an air conditioner, or the like) installed in the vehicle 600. The semiconductor device 610 may be incorporated in any electrical component installed in the vehicle 600.

<<Supplementaries>>

Supplementaries for those described above will be explained.

For any signals or voltages, relationships between high and low levels can be reversed to those described above without departing from the spirit thereof.

Any of the above-described transistors may be any type of transistor as long as a problem does not occur. For example, any of the above-described transistors as MOSFETs may be replaced with junction FETs, IGBTs (Insulated Gate Bipolar Transistors), or bipolar transistors as long as a problem does not occur. Any transistor has a first electrode, a second electrode, and a control electrode. In an FET, one of the first and second electrodes is a drain and the other one is a source, and the control electrode is a gate. In an IGBT, one of the first and second electrodes is a collector and the other one is an emitter, and the control electrode is a gate. In a bipolar transistor not belonging to IGBTs, one of the first and second electrodes is a collector and the other one is an emitter, and the control electrode is a base.

The embodiments of the present disclosure can be appropriately modified in various ways within the scope of the technical ideas indicated in the claims. The above embodiments are merely examples of the embodiments of the present disclosure, and the meanings of the terms of the present disclosure and each constituent element are not limited to those described in the above embodiments. The specific numerical values given in the above description are merely examples and can, of course, be changed to various numerical values.

[Supplementary Notes]

Supplementary Notes are provided for the present disclosure in which specific configuration examples are shown in the above-described embodiments.

A clock signal generation circuit (see FIG. 1) according to one aspect of the present disclosure has a configuration (first configuration) that includes: a triangular wave generation circuit (111) configured to generate a triangular wave signal (S111): a pseudo-random number generation circuit (112) configured to generate a pseudo-random number signal (S112): a limiter circuit (113) configured to perform a limitation process of limiting an amount of change per unit time in the pseudo-random number signal and generate the pseudo-random number signal subjected to the limitation process as a limiter signal (S113): a linear arithmetic circuit (114) configured to generate a frequency control signal (S114) by performing a linear arithmetic operation on the triangular wave signal and the limiter signal: and an oscillator (120) configured to generate a clock signal (S122) having a frequency corresponding to the frequency control signal.

According to the first configuration, the frequency of the clock signal can be spread favorably, thereby reducing radiation noise. At this time, the radiation noise caused by the triangular wave can be suppressed by using pseudo-random numbers. Further, the limitation process can also suppress the radiation noise that may occur due to abrupt changes in the values of the pseudo-random numbers.

The clock signal generation circuit of the first configuration may have a configuration (second configuration) in which the pseudo-random number generation circuit updates and outputs a value of the pseudo-random number signal based on the unit time as a period, and the limiter circuit generates a signal, which is based on an output of the pseudo-random number generation circuit and the amount of change per unit time is limited to a predetermined value or less, as the limiter signal.

The clock signal generation circuit of the first or second configuration may have a configuration (third configuration) in which in the linear arithmetic operation, the linear arithmetic circuit adds one of the triangular wave signal and the limiter signal to the other one, or subtracts one of the triangular wave signal and the limiter signal from the other one.

A clock signal generation circuit (see FIG. 9) according to another aspect of the present disclosure has a configuration (fourth configuration) that includes: a triangular wave generation circuit (211) configured to generate a triangular wave signal (S211): a pseudo-random number generation circuit (212) configured to generate a pseudo-random number signal (S212): a linear arithmetic circuit (213) configured to generate a linear arithmetic result signal (S213) by performing a linear arithmetic operation on the triangular wave signal and the pseudo-random number signal: a limiter circuit (214) configured to perform a limitation process of limiting an amount of change per unit time in the linear arithmetic result signal and generate the linear arithmetic result signal subjected to the limitation process as a frequency control signal (S214): and an oscillator (220) configured to generate a clock signal (S222) having a frequency corresponding to the frequency control signal.

According to the fourth configuration, the frequency of the clock signal can be spread favorably, thereby reducing radiation noise. At this time, the radiation noise caused by the triangular wave can be suppressed by using pseudo-random numbers. Further, the limitation process can also suppress the radiation noise that may occur due to abrupt changes in the values of the pseudo-random numbers.

The clock signal generation circuit of the fourth configuration may have a configuration (fifth configuration) in which the pseudo-random number generation circuit updates and outputs a value of the pseudo-random number signal based on the unit time as a period, the linear arithmetic circuit updates and outputs a value of the linear arithmetic result signal based on the unit time as a period, and the limiter circuit generates a signal, which is based on an output of the linear arithmetic circuit and the amount of change per unit time is limited to a predetermined value or less, as the frequency control signal.

The clock signal generation circuit of the fourth or fifth configuration may have a configuration (sixth configuration) in which in the linear arithmetic operation, the linear arithmetic circuit adds one of the triangular wave signal and the pseudo-random number signal to the other one, or subtracts one of the triangular wave signal and the pseudo-random number signal from the other one.

A DC/DC converter (100, 200) according to the present disclosure has a configuration (seventh configuration) that includes: the clock signal generation circuit (110 and 120, 210 and 220) of any one of the first to sixth configurations; and a power conversion circuit (130, 230) configured to generate a second DC voltage by switching a first DC voltage at a switching frequency corresponding to the clock signal.

A PWM signal generator (500) according to the present disclosure has a configuration (eighth configuration) that includes: the clock signal generation circuit (510) of any one of the first to sixth configurations; and a pulse width modulation circuit (520) configured to generate a pulse width modulation signal based on the clock signal.

A vehicle (600) according to the present disclosure has a configuration (ninth configuration) that includes: a semiconductor device (610) having the clock signal generation circuit of any one of the first to sixth configurations.

According to the present disclosure in some embodiments, it is possible to provide a clock signal generation circuit that contributes to reducing radiation noise, a DC/DC converter, a PWM signal generator, and a vehicle.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A clock signal generation circuit comprising:
   a triangular wave generation circuit configured to generate a triangular wave signal:
   a pseudo-random number generation circuit configured to generate a pseudo-random number signal;
   a limiter circuit configured to perform a limitation process of limiting an amount of change per unit time in the pseudo-random number signal and generate the pseudo-random number signal subjected to the limitation process as a limiter signal;
   a linear arithmetic circuit configured to generate a frequency control signal by performing a linear arithmetic operation on the triangular wave signal and the limiter signal; and
   an oscillator configured to generate a clock signal having a frequency corresponding to the frequency control signal.

2. The clock signal generation circuit of claim 1, wherein the pseudo-random number generation circuit updates and outputs a value of the pseudo-random number signal based on the unit time as a period, and
   wherein the limiter circuit generates a signal, which is based on an output of the pseudo-random number generation circuit and the amount of change per unit time is limited to a predetermined value or less, as the limiter signal.

3. The clock signal generation circuit of claim 1, wherein in the linear arithmetic operation, the linear arithmetic circuit adds one of the triangular wave signal and the limiter signal to the other one, or subtracts one of the triangular wave signal and the limiter signal from the other one.

4. A clock signal generation circuit comprising:
a triangular wave generation circuit configured to generate a triangular wave signal:
a pseudo-random number generation circuit configured to generate a pseudo-random number signal:
a linear arithmetic circuit configured to generate a linear arithmetic result signal by performing a linear arithmetic operation on the triangular wave signal and the pseudo-random number signal:
a limiter circuit configured to perform a limitation process of limiting an amount of change per unit time in the linear arithmetic result signal and generate the linear arithmetic result signal subjected to the limitation process as a frequency control signal; and
an oscillator configured to generate a clock signal having a frequency corresponding to the frequency control signal.

5. The clock signal generation circuit of claim 4, wherein the pseudo-random number generation circuit updates and outputs a value of the pseudo-random number signal based on the unit time as a period, wherein the linear arithmetic circuit updates and outputs a value of the linear arithmetic result signal based on the unit time as a period, and wherein the limiter circuit generates a signal, which is based on an output of the linear arithmetic circuit and the amount of change per unit time is limited to a predetermined value or less, as the frequency control signal.

6. The clock signal generation circuit of claim 4, wherein in the linear arithmetic operation, the linear arithmetic circuit adds one of the triangular wave signal and the pseudo-random number signal to the other one, or subtracts one of the triangular wave signal and the pseudo-random number signal from the other one.

7. A DC/DC converter comprising:
the signal generation circuit of claim 1; and
a power conversion circuit configured to generate a second DC voltage by switching a first DC voltage at a switching frequency corresponding to the clock signal.

8. A PWM signal generator comprising:
the signal generation circuit of claim 1; and
a pulse width modulation circuit configured to generate a pulse width modulation signal based on the clock signal.

9. An in-vehicle semiconductor device comprising the clock signal generation circuit of claim 1.

* * * * *